(12) United States Patent
Khoshnevisan et al.

(10) Patent No.: US 12,342,355 B2
(45) Date of Patent: Jun. 24, 2025

(54) TECHNIQUES FOR TRANSMISSION CONFIGURATION INDICATOR STATES OF SINGLE-FREQUENCY NETWORK CONTROL CHANNEL REPETITIONS

(71) Applicant: QUALCOMM Incorporated, San Diego, CA (US)

(72) Inventors: Mostafa Khoshnevisan, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 368 days.

(21) Appl. No.: 17/586,186

(22) Filed: Jan. 27, 2022

(65) Prior Publication Data

US 2022/0361219 A1    Nov. 10, 2022

Related U.S. Application Data

(60) Provisional application No. 63/185,638, filed on May 7, 2021.

(51) Int. Cl.
*H04W 72/23* (2023.01)
*H04L 5/00* (2006.01)
*H04W 72/231* (2023.01)

(52) U.S. Cl.
CPC ......... *H04W 72/231* (2023.01); *H04L 5/0053* (2013.01); *H04L 5/0094* (2013.01); *H04W 72/23* (2023.01)

(58) Field of Classification Search
CPC .. H04W 72/23–232; H04W 72/20–232; H04L 5/0053; H04L 5/0091–0094
See application file for complete search history.

(56) References Cited

U.S. PATENT DOCUMENTS

| | | | |
|---|---|---|---|
| 11,184,132 B2* | 11/2021 | Tsai | H04L 27/2627 |
| 11,647,525 B2* | 5/2023 | Kim | H04L 1/08 |
| | | | 370/329 |
| 11,909,674 B2* | 2/2024 | Wu | H04L 5/0023 |
| 12,082,306 B2* | 9/2024 | Noh | H04W 76/27 |
| 2019/0045533 A1* | 2/2019 | Chatterjee | H04W 72/23 |

(Continued)

FOREIGN PATENT DOCUMENTS

CN    114499787 A  *  5/2022

*Primary Examiner* — Brendan Y Higa
(74) *Attorney, Agent, or Firm* — Holland & Hart LLP/Qualcomm

(57) ABSTRACT

Methods, systems, and devices for wireless communications are described. A user equipment (UE) may receive, from a base station, control signaling indicating first and second control resource sets (CORESETs) associated with first and second sets of transmission configuration indicator (TCI) states, respectively, where first and second CORESETs are linked for control channel repetition, and where the first and/or second sets of TCI states include two or more TCI states. The UE may receive one or more repetitions of a control message scheduling a downlink message from the base station to the UE within control channel candidates of the linked CORESETs. The UE may identify, in accordance with a TCI configuration, at least one TCI state for the downlink message from the first and/or second sets of TCI states. The UE may then monitor for the downlink message using the at least one identified TCI state.

20 Claims, 17 Drawing Sheets

(56) References Cited

U.S. PATENT DOCUMENTS

| | | | |
|---|---|---|---|
| 2019/0260458 A1* | 8/2019 | Zhou | H04W 72/046 |
| 2019/0297603 A1* | 9/2019 | Guo | H04L 5/0053 |
| 2020/0007296 A1* | 1/2020 | Papasakellariou | H04L 5/0053 |
| 2020/0045569 A1* | 2/2020 | Seo | H04L 5/0048 |
| 2020/0077369 A1 | 3/2020 | Zhang et al. | |
| 2020/0229161 A1* | 7/2020 | Raghavan | H04W 24/10 |
| 2021/0014931 A1* | 1/2021 | Noh | H04L 5/0035 |
| 2021/0050936 A1* | 2/2021 | Seo | H04L 5/0053 |
| 2021/0091900 A1* | 3/2021 | Zhang | H04W 72/20 |
| 2021/0250944 A1* | 8/2021 | Ji | H04L 1/08 |
| 2022/0053468 A1* | 2/2022 | Chen | H04L 5/0053 |
| 2022/0124686 A1* | 4/2022 | Lee | H04L 1/00 |
| 2022/0210818 A1* | 6/2022 | Cirik | H04W 72/232 |
| 2022/0264339 A1* | 8/2022 | Kim | H04B 17/373 |
| 2023/0120035 A1* | 4/2023 | Taherzadeh Boroujeni | H04B 17/3912 370/329 |
| 2023/0132040 A1* | 4/2023 | Gao | H04W 72/23 370/329 |
| 2023/0137907 A1* | 5/2023 | Fang | H04W 48/12 370/329 |
| 2023/0156738 A1* | 5/2023 | Gao | H04L 5/0053 370/330 |
| 2023/0171775 A1* | 6/2023 | Pan | H04L 5/0023 370/329 |
| 2023/0354347 A1* | 11/2023 | Kim | H04L 1/0009 |
| 2024/0007900 A1* | 1/2024 | Ren | H04W 72/232 |
| 2024/0163956 A1* | 5/2024 | Matsumura | H04W 72/0453 |

\* cited by examiner

TECHNIQUES FOR TRANSMISSION CONFIGURATION INDICATOR STATES OF SINGLE-FREQUENCY NETWORK CONTROL CHANNEL REPETITIONS

CROSS REFERENCE

The present application for patent claims the benefit of U.S. Provisional Patent Application No. 63/185,638 by KHOSHNEVISAN et al., entitled "TECHNIQUES FOR TRANSMISSION CONFIGURATION INDICATOR STATES OF SINGLE-FREQUENCY NETWORK CONTROL CHANNEL REPETITIONS," filed May 7, 2021, assigned to the assignee hereof, and expressly incorporated by reference herein.

FIELD OF TECHNOLOGY

The following relates to wireless communications, including techniques for transmission configuration indicator (TCI) states of single-frequency network (SFN) control channel repetitions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, downlink control messages (e.g., downlink control information (DCI) messages) may schedule other downlink messages from a base station to a UE. The UE may be configured to determine what transmission configuration indicator (TCI) state (e.g., quasi co-location (QCL) assumption) is to be used for receiving the scheduled downlink message based on the downlink control message.

SUMMARY

The described techniques relate to improved methods, systems, devices, and apparatuses that support techniques for TCI states SFN control channel repetitions. Generally, the described techniques provide for identifying which TCI state(s) a UE is to use for receiving a downlink message when repetitions of a scheduling control message occur in a set of physical downlink control channel (PDCCH) candidates linked across two control resource sets (CORESETs) that are associated with multiple TCI states (e.g., SFNed CORESETs). In some aspects, a UE may identify at least one TCI state for monitoring for the scheduled downlink message in accordance with a TCI configuration. The TCI configuration may define a set of rules for identifying the TCI state for the scheduled downlink message, and may be pre-configured at the UE, signaled to the UE, or both.

A method for wireless communication at a UE is described. The method may include receiving, from a network device, control signaling indicating a first CORESET associated with a first set of TCI states and a second CORESET associated with a second set of TCI states, where a first control channel candidate associated with the first CORESET is linked for control channel repetition to a second control channel candidate associated with the second CORESET, and where the first set of TCI states, the second set of TCI states, or both, includes two or more TCI states, receiving, from the network device within the first control channel candidate, the second control channel candidate, or both, one or more repetitions of a control message scheduling a downlink message from the network device to the UE, identifying, in accordance with a TCI configuration, at least one TCI state for the downlink message from the first set of TCI states, the second set of TCI states, or both, and monitoring for the downlink message using the at least one identified TCI state.

An apparatus for wireless communication at a UE is described. The apparatus may include a processor, memory coupled with the processor, and instructions stored in the memory. The instructions may be executable by the processor to cause the apparatus to receive, from a network device, control signaling indicating a first CORESET associated with a first set of TCI states and a second CORESET associated with a second set of TCI states, where a first control channel candidate associated with the first CORESET is linked for control channel repetition to a second control channel candidate associated with the second CORESET, and where the first set of TCI states, the second set of TCI states, or both, includes two or more TCI states, receive, from the network device within the first control channel candidate, the second control channel candidate, or both, one or more repetitions of a control message scheduling a downlink message from the network device to the UE, identify, in accordance with a TCI configuration, at least one TCI state for the downlink message from the first set of TCI states, the second set of TCI states, or both, and monitor for the downlink message using the at least one identified TCI state.

Another apparatus for wireless communication at a UE is described. The apparatus may include means for receiving, from a network device, control signaling indicating a first CORESET associated with a first set of TCI states and a second CORESET associated with a second set of TCI states, where a first control channel candidate associated with the first CORESET is linked for control channel repetition to a second control channel candidate associated with the second CORESET, and where the first set of TCI states, the second set of TCI states, or both, includes two or more TCI states, means for receiving, from the network device within the first control channel candidate, the second control channel candidate, or both, one or more repetitions of a control message scheduling a downlink message from the network device to the UE, means for identifying, in accordance with a TCI configuration, at least one TCI state for the downlink message from the first set of TCI states, the second set of TCI states, or both, and means for monitoring for the downlink message using the at least one identified TCI state.

A non-transitory computer-readable medium storing code for wireless communication at a UE is described. The code may include instructions executable by a processor to receive, from a network device, control signaling indicating a first CORESET associated with a first set of TCI states and a second CORESET associated with a second set of TCI states, where a first control channel candidate associated with the first CORESET is linked for control channel repetition to a second control channel candidate associated with the second CORESET, and where the first set of TCI states, the second set of TCI states, or both, includes two or more TCI states, receive, from the network device within the first control channel candidate, the second control channel candidate, or both, one or more repetitions of a control message scheduling a downlink message from the network device to the UE, identify, in accordance with a TCI configuration, at least one TCI state for the downlink message from the first set of TCI states, the second set of TCI states, or both, and monitor for the downlink message using the at least one identified TCI state.

Some examples of the method, apparatuses, and non-transitory computer-readable medium described herein may further include operations, features, means, or instructions for receiving the downlink message in accordance with the identified TCI state and based on the monitoring.

Some examples of the method, apparatuses, and non-transitory computer-readable medium described herein may further include operations, features, means, or instructions for receiving, via the control signaling, an indication of the TCI configuration, where the identifying may be based on the additional control signaling.

In some examples of the method, apparatuses, and non-transitory computer-readable medium described herein, monitoring for the downlink message may include operations, features, means, or instructions for monitoring for the downlink message using the at least one TCI state that may be associated with a highest TCI state identifier or a lowest TCI state identifier among the first set of TCI states and the second set of TCI states.

In some examples of the method, apparatuses, and non-transitory computer-readable medium described herein, monitoring for the downlink message may include operations, features, means, or instructions for monitoring for the downlink message using the at least one TCI state corresponding to one of the first CORESET or the second CORESET.

In some examples of the method, apparatuses, and non-transitory computer-readable medium described herein, monitoring for the downlink message may include operations, features, means, or instructions for monitoring for the downlink message using the at least one TCI state of the first CORESET or the second CORESET that may be associated with a highest CORESET identifier or a lowest CORESET identifier.

In some examples of the method, apparatuses, and non-transitory computer-readable medium described herein, monitoring for the downlink message may include operations, features, means, or instructions for monitoring for the downlink message using the at least one TCI state of the first CORESET or the second CORESET that may be associated with a highest search space set identifier or a lowest search space set identifier.

In some examples of the method, apparatuses, and non-transitory computer-readable medium described herein, monitoring for the downlink message may include operations, features, means, or instructions for monitoring for the downlink message using the at least one TCI state which may be associated with a CORESET of the first CORESET or the second CORESET which may be associated with the single TCI state, where the at least one TCI state includes the single TCI state.

In some examples of the method, apparatuses, and non-transitory computer-readable medium described herein, monitoring for the downlink message may include operations, features, means, or instructions for monitoring for the downlink message using a second TCI state from one of the first set of TCI states or the second set of TCI states which includes the two or more TCI states.

In some examples of the method, apparatuses, and non-transitory computer-readable medium described herein, monitoring for the downlink message may include operations, features, means, or instructions for monitoring for the downlink message using the at least one TCI state which may be associated with a CORESET of the first CORESET or the second CORESET which may be associated with the two or more TCI states.

In some examples of the method, apparatuses, and non-transitory computer-readable medium described herein, the at least one TCI state includes the two or more TCI states.

In some examples of the method, apparatuses, and non-transitory computer-readable medium described herein, monitoring for the downlink message may include operations, features, means, or instructions for monitoring for the downlink message using the at least one TCI state that may be associated with a highest TCI state identifier or a lowest TCI state identifier among the two or more TCI states.

Some examples of the method, apparatuses, and non-transitory computer-readable medium described herein may further include operations, features, means, or instructions for receiving, from the network device, additional control signaling including an indication of a TCI state of the two or more TCI states, where identifying the at least one TCI state may be based on the additional control signaling.

In some examples of the method, apparatuses, and non-transitory computer-readable medium described herein, monitoring for the control message may include operations, features, means, or instructions for monitoring for the control message using the at least one TCI state which includes an anchor TCI state or a non-anchor TCI state.

In some examples of the method, apparatuses, and non-transitory computer-readable medium described herein, monitoring for the downlink message may include operations, features, means, or instructions for monitoring for the downlink message using the at least one TCI state based on the at least one TCI state being included within the first set of TCI states and the second set of TCI states.

Some examples of the method, apparatuses, and non-transitory computer-readable medium described herein may further include operations, features, means, or instructions for identifying a set of mappings between a set of TCI codepoints and a set of TCI states configured at the UE, where identifying the at least one TCI state may be based on the set of mappings.

In some examples of the method, apparatuses, and non-transitory computer-readable medium described herein, at least one mapping of the set of mappings includes a mapping between a TCI codepoint of the set of TCI codepoints and two TCI states of the set of TCI states, and identifying the at least one TCI state may be based on the at least one mapping.

In some examples of the method, apparatuses, and non-transitory computer-readable medium described herein, the first CORESET, the second CORESET, or both, may be associated with a SFN.

Some examples of the method, apparatuses, and non-transitory computer-readable medium described herein may further include operations, features, means, or instructions for identifying that the one or more repetitions of the control message do not include a TCI field, where identifying the at least one TCI state may be based on identifying that the one or more repetitions of the control message do not include the TCI field.

In some examples of the method, apparatuses, and non-transitory computer-readable medium described herein, monitoring for the downlink message may include operations, features, means, or instructions for monitoring for the downlink message using the at least one identified TCI state based on a time interval between reception of the one or more repetitions of the control message and reception of the downlink message being greater than or equal to a threshold time interval, and based on the first set of TCI states, the second set of TCI states, or both, being associated with the QCL TypeD.

A method for wireless communication at a network device is described. The method may include transmitting, to a UE, control signaling indicating a first CORESET associated with a first set of TCI states and a second CORESET associated with a second set of TCI states, where a first control channel candidate associated with the first CORESET is linked for control channel repetition to a second control channel candidate associated with the second CORESET, and where the first set of TCI states, the second set of TCI states, or both, includes two or more TCI states, transmitting, to the UE within the first control channel candidate, the second control channel candidate, or both, one or more repetitions of a control message scheduling a downlink message from the network device to the UE, identifying, in accordance with a TCI configuration, at least one TCI state for the downlink message from the first set of TCI states, the second set of TCI states, or both, and transmitting the downlink message using the at least one identified TCI state.

An apparatus for wireless communication at a network device is described. The apparatus may include a processor, memory coupled with the processor, and instructions stored in the memory. The instructions may be executable by the processor to cause the apparatus to transmit, to a UE, control signaling indicating a first CORESET associated with a first set of TCI states and a second CORESET associated with a second set of TCI states, where a first control channel candidate associated with the first CORESET is linked for control channel repetition to a second control channel candidate associated with the second CORESET, and where the first set of TCI states, the second set of TCI states, or both, includes two or more TCI states, transmit, to the UE within the first control channel candidate, the second control channel candidate, or both, one or more repetitions of a control message scheduling a downlink message from the network device to the UE, identify, in accordance with a TCI configuration, at least one TCI state for the downlink message from the first set of TCI states, the second set of TCI states, or both, and transmit the downlink message using the at least one identified TCI state.

Another apparatus for wireless communication at a network device is described. The apparatus may include means for transmitting, to a UE, control signaling indicating a first CORESET associated with a first set of TCI states and a second CORESET associated with a second set of TCI states, where a first control channel candidate associated with the first CORESET is linked for control channel repetition to a second control channel candidate associated with the second CORESET, and where the first set of TCI states, the second set of TCI states, or both, includes two or more TCI states, means for transmitting, to the UE within the first control channel candidate, the second control channel candidate, or both, one or more repetitions of a control message scheduling a downlink message from the network device to the UE, means for identifying, in accordance with a TCI configuration, at least one TCI state for the downlink message from the first set of TCI states, the second set of TCI states, or both, and means for transmitting the downlink message using the at least one identified TCI state.

A non-transitory computer-readable medium storing code for wireless communication at a network device is described. The code may include instructions executable by a processor to transmit, to a UE, control signaling indicating a first CORESET associated with a first set of TCI states and a second CORESET associated with a second set of TCI states, where a first control channel candidate associated with the first CORESET is linked for control channel repetition to a second control channel candidate associated with the second CORESET, and where the first set of TCI states, the second set of TCI states, or both, includes two or more TCI states, transmit, to the UE within the first control channel candidate, the second control channel candidate, or both, one or more repetitions of a control message scheduling a downlink message from the network device to the UE, identify, in accordance with a TCI configuration, at least one TCI state for the downlink message from the first set of TCI states, the second set of TCI states, or both, and transmit the downlink message using the at least one identified TCI state.

Some examples of the method, apparatuses, and non-transitory computer-readable medium described herein may further include operations, features, means, or instructions for transmitting, via the control signaling, an indication of the TCI configuration, where the identifying may be based on the control signaling.

In some examples of the method, apparatuses, and non-transitory computer-readable medium described herein, transmitting the downlink message may include operations, features, means, or instructions for transmitting the downlink message using the at least one TCI state that may be associated with a highest TCI state identifier or a lowest TCI state identifier among the first set of TCI states and the second set of TCI states.

In some examples of the method, apparatuses, and non-transitory computer-readable medium described herein, transmitting the downlink message may include operations, features, means, or instructions for transmitting the downlink message using the at least one TCI state corresponding to one of the first CORESET or the second CORESET.

In some examples of the method, apparatuses, and non-transitory computer-readable medium described herein, transmitting the downlink message may include operations, features, means, or instructions for transmitting the downlink message using the at least one TCI state of the first CORESET or the second CORESET that may be associated with a highest CORESET identifier or a lowest CORESET identifier.

In some examples of the method, apparatuses, and non-transitory computer-readable medium described herein, transmitting the downlink message may include operations, features, means, or instructions for transmitting the downlink message using the at least one TCI state of the first CORESET or the second CORESET that may be associated with a highest search space set identifier or a lowest search space set identifier.

In some examples of the method, apparatuses, and non-transitory computer-readable medium described herein, transmitting the downlink message may include operations, features, means, or instructions for transmitting the downlink message using the at least one TCI state which may be associated with a CORESET of the first CORESET or the second CORESET which may be associated with the single TCI state, where the at least one TCI state includes the single TCI state.

In some examples of the method, apparatuses, and non-transitory computer-readable medium described herein, transmitting the downlink message may include operations, features, means, or instructions for transmitting the downlink message using a second TCI state from one of the first set of TCI states or the second set of TCI states which includes the two or more TCI states.

In some examples of the method, apparatuses, and non-transitory computer-readable medium described herein, transmitting the downlink message may include operations, features, means, or instructions for transmitting the downlink message using the at least one TCI state which may be associated with a CORESET of the first CORESET or the second CORESET which may be associated with the two or more TCI states.

In some examples of the method, apparatuses, and non-transitory computer-readable medium described herein, the at least one TCI state includes the two or more TCI states.

In some examples of the method, apparatuses, and non-transitory computer-readable medium described herein, transmitting the downlink message may include operations, features, means, or instructions for transmitting the downlink message using the at least one TCI state that may be associated with a highest TCI state identifier or a lowest TCI state identifier among the two or more TCI states.

Some examples of the method, apparatuses, and non-transitory computer-readable medium described herein may further include operations, features, means, or instructions for transmitting, to the UE, additional control signaling including an indication of a TCI state of the two or more TCI states, where identifying the at least one TCI state may be based on the additional control signaling.

In some examples of the method, apparatuses, and non-transitory computer-readable medium described herein, transmitting the control message may include operations, features, means, or instructions for transmitting the control message using the at least one TCI state which includes an anchor TCI state or a non-anchor TCI state.

In some examples of the method, apparatuses, and non-transitory computer-readable medium described herein, transmitting the downlink message may include operations, features, means, or instructions for transmitting the downlink message using the at least one TCI state based on the at least one TCI state being included within the first set of TCI states and the second set of TCI states.

Some examples of the method, apparatuses, and non-transitory computer-readable medium described herein may further include operations, features, means, or instructions for identifying a set of mappings between a set of TCI codepoints and a set of TCI states configured at the UE, where identifying the at least one TCI state may be based on the set of mappings.

In some examples of the method, apparatuses, and non-transitory computer-readable medium described herein, at least one mapping of the set of mappings includes a mapping between a TCI codepoint of the set of TCI codepoints and two TCI states of the set of TCI states, and identifying the at least one TCI state may be based on the at least one mapping.

In some examples of the method, apparatuses, and non-transitory computer-readable medium described herein, the first CORESET, the second CORESET, or both, may be associated with a SFN.

Some examples of the method, apparatuses, and non-transitory computer-readable medium described herein may further include operations, features, means, or instructions for identifying that the one or more repetitions of the control message do not include a TCI field, where identifying the at least one TCI state may be based on identifying that the one or more repetitions of the control message do not include the TCI field.

DETAILED DESCRIPTION

Figure 1:
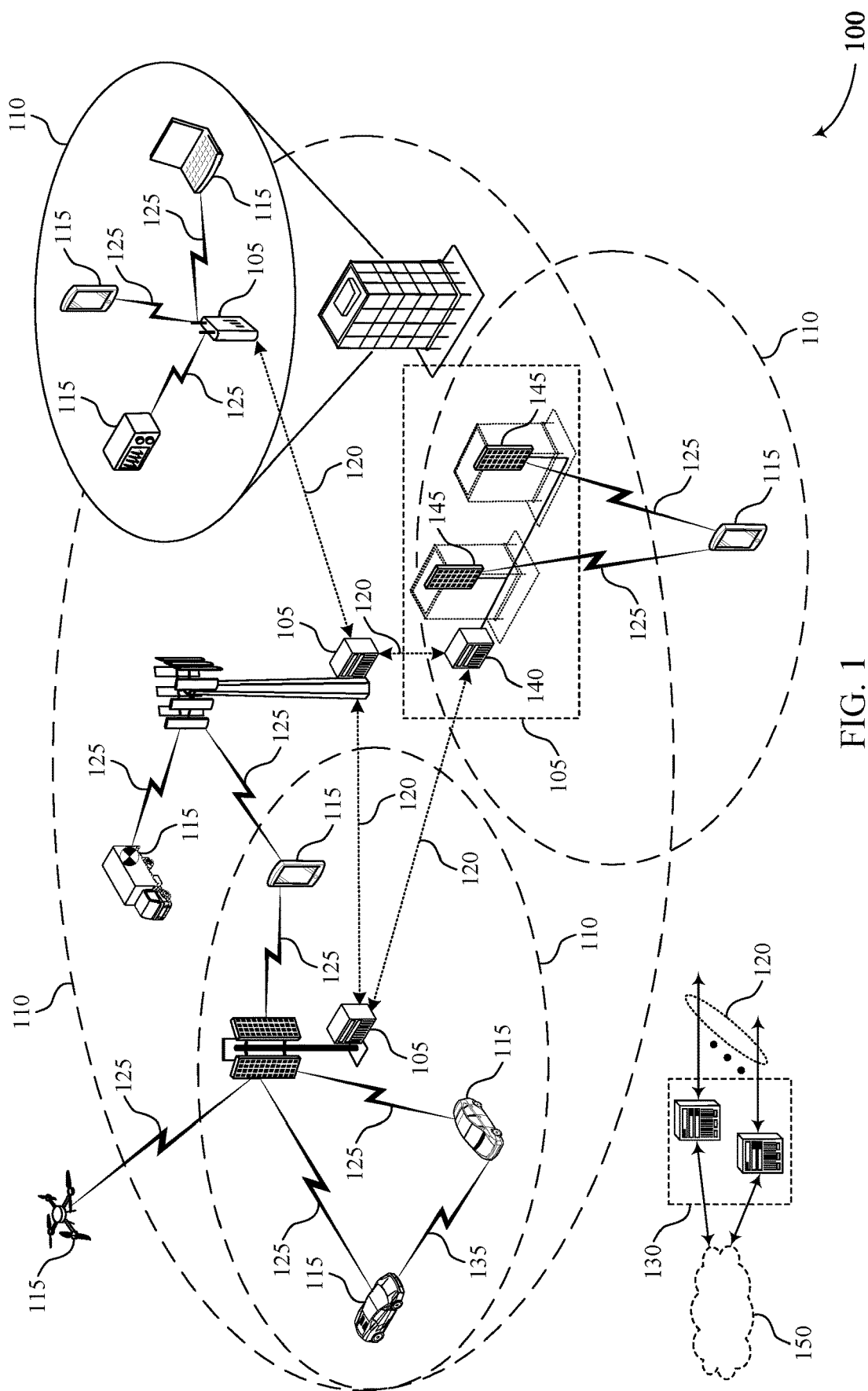
FIG. 1 illustrates an example of a wireless communications system that supports techniques for TCI states of SFN control channel repetitions in accordance with aspects of the present disclosure.

In some wireless communications systems, downlink control messages (e.g., DCI messages) may schedule communication of other downlink messages (e.g., physical downlink shared channel (PDSCH) messages) from a base station to a UE. The UE may be configured to determine what TCI state (e.g., QCL assumption) is to be used for receiving the scheduled downlink PDSCH message based on the downlink control message. For example, the TCI state used for transmission of the downlink control message may also be used for the scheduled downlink PDSCH message. However, some downlink PDSCH messages (e.g., SFN downlink messages) may be associated with multiple TCI states, which complicates the determination for which TCI state is to be used for receiving the scheduled downlink PDSCH message.

Moreover, in some cases, multiple control channel candidates (e.g., PDCCH candidates) may be linked for multiple repetitions of the same downlink control message, where each of the control channel candidates may be associated with one (or multiple) TCI states. Thus, for two linked control channel candidates used for scheduling a same downlink PDSCH message, there may be up to four possible TCI states which potentially could be used for receiving the scheduled downlink message. Some wireless communications systems do not provide a UE with a mechanism for determining which TCI state(s) should be used for PDSCH reception.

Accordingly, aspects of the present disclosure provide techniques for identifying which TCI state(s) a UE is to use for receiving a downlink message when repetitions of a scheduling control message occur in a set of PDCCH candidates linked across two CORESETs that are associated with multiple TCI states. In other words, techniques described herein enable a UE to determine which TCI state(s) are to be applied when multiple CORESETs are linked for control channel repetition, and where at least one CORESET is associated with multiple TCI states (e.g., at least one CORESET is associated with an SFN). For the purposes of the present disclosure, the terms "TCI state" and "QCL assumption" may be used to refer to a beam (or set of beams) which are used to transmit/receive a message between wireless devices. Accordingly, the terms "TCI state" and "QCL assumption" may be used interchangeably.

In accordance with aspects of the present disclosure, a UE may receive one or more repetitions of a control message within PDCCH candidates that are linked for control channel repetition, where at least one of the PDCCH candidates is associated with an SFN CORESET including multiple TCI states. The one or more repetitions of the control message may schedule a downlink message at the UE, and may not include TCI fields indicating TCI state(s) for the scheduled downlink message. The UE may identify at least one TCI state for monitoring for the scheduled downlink message in accordance with a TCI configuration. The TCI configuration may define a set of rules for identifying the one or more TCI states for reception of the scheduled downlink message, and may be pre-configured at the UE, signaled to the UE, or both. In some cases, the UE may identify the one or more TCI states for reception of the scheduled downlink message based on a highest/lowest TCI state ID among the set of linked PDCCH candidates. In other cases, the UE may identify a PDCCH candidate which is associated with a single TCI state, and may use the single TCI state to monitor for the downlink message. In other cases, the UE may identify a CORESET corresponding to the set of linked PDCCH candidates that is associated with one or more TCI states based on the TCI configuration, and may use the one or more TCI state(s) of the identified CORESET for receiving the scheduled downlink message.

Aspects of the disclosure are initially described in the context of wireless communications systems. Additional aspects of the disclosure are described in the context of an example resource configuration and an example process flow. Aspects of the disclosure are further illustrated by and described with reference to apparatus diagrams, system diagrams, and flowcharts that relate to techniques for TCI states of SFN control channel repetitions.

FIG. 1 illustrates an example of a wireless communications system 100 that supports techniques for TCI states of SFN control channel repetitions in accordance with aspects of the present disclosure. The wireless communications system 100 may include one or more base stations 105 (or network devices 105), one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., network devices suc has network nodes, core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, hybrid TDM-FDM techniques, space division multiplexing (SDM) techniques, or any combination thereof. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some aspects, a UE 115 of the wireless communications system 100 may be configured (e.g., via RRC signaling) with up to three CORESETS within a given BWP of a serving cell (e.g., within a given BWP of a component carrier). In some cases (e.g., Release 16), a UE 115 may be configured with up to five CORESETs in a BWP of a serving cell. A CORESET may be associated with one or more transmission configuration indicator (TCI) states for PDCCH repetition, and may be associated with a quantity of resource blocks (RBs) in the frequency domain, and a quantity of symbols or other TTI in the time domain (e.g., quantity of 1/2/3 OFDM symbols), each of which may be configured (e.g., via RRC signaling). Moreover, each CORESET may be associated with one active TCI state. In some aspects, a CORESET configured at the UE 115 may be associated with a CCE resource element group (CCE-REG) mapping type (e.g., CCE-REG bundle mapping type), a precoding granularity, an identifier (e.g., scrambling identifier) associated with scrambling for PDCCH demodulation reference signals (DMRS), coded bits of DCI content, or any combination thereof.

In some aspects, a UE 115 may be configured with up to ten search space sets within a given BWP of a component carrier. In some aspects, each search space set may be associated with one CORESET, and may include a set of monitoring occasions. In some aspects, a search space set may include a set of control channel monitoring occasions. For example, a search space set may include a set of monitoring occasions, with a monitoring occasion occurring at regular or irregular periodicities (e.g., monitoring occasion every 10 ms). The UE 115 may be configured to blindly decode signals received in the respective monitoring occasions to determine whether CRC passes in the respective monitoring occasions. Moreover, a UE 115 may be configured to determine the control channel monitoring occasions associated with a given search space set based on one or more characteristics of the search space set which may be configured (e.g., pre-configured) at the UE 115, indicated to the UE 115 via a base station 105 (e.g., via RRC signaling), or both. A UE 115 may be configured with one or more different types of search space sets (e.g., searchSpaceType), including UE-specific search space sets, common search space sets, or both. Additionally, each search space set may be associated with one or more DCI formats which are to be monitored.

Parameters of a search space set (s) may include a periodicity ($k_s$) of monitoring occasions (e.g., $k_s$ slots), an offset ($o_s$) for monitoring occasions in units of slots (e.g., $o_s$ slots) (e.g., monitoringSlotPeriodicityAndOffset), a duration ($T_s$) indicative of a quantity of slots within a period in which the search space set exists (where $T_s < k_s$), or any combination thereof. A UE 115 of the wireless communications system 100 may determine a number/quantity of PDCCH monitoring occasions (e.g., PDCCH candidates) within a slot $\eta_{s,f}^{\mu}$ and a frame $\eta_f$ if $\eta_f N_{slot}^{frame,\mu} + \eta_{s,f}^{\mu} o_s \mod k_s = 0$. In some aspects, when monitoring a control channel, a UE 115 may be configured to monitor control channel candidates (e.g., PDCCH candidates) for a search space set s for $T_s$ consecutive slots, starting from slot $\eta_{s,f}^{\mu}$, and may refrain from monitoring control channel candidates for the search space set s for the next $k_s - T_s$ consecutive slots. Quantities of control channel candidates (e.g., PDCCH candidates) may be based on an aggregation level (e.g., number of CCEs) of wireless communications at the UE 115.

These search space set parameters may be configured (e.g., pre-configured) at the UE 115, indicated to the UE 115 via a base station 105 (e.g., via RRC signaling), or both. For example, RRC signaling may be used to configure parameters of a search space set at a UE 115, including with which CORESET the search space set is associated, a periodicity of monitoring occasions of the search space set, an offset of the monitoring occasions, DCI formats to monitor, a number of PDCCH candidates for a given aggregation level of the search space set, and the like.

Each search space set may be associated with a search space set index. In some implementations, PDCCH candidates may be defined as part of the search space set configuration. For example, a search space set include a set of PDCCH candidates, where each PDCCH candidate is associated with a given aggregation level and candidate index. In some aspects, a UE 115 may be configured to monitor PDCCH candidates in configured search space sets. The UE 115 may be configured to blindly decode the PDCCH candidates (e.g., monitoring occasions) within one or more search space sets. In cases where the UE 115 receive a DCI message within a PDCCH candidate, the UE 115 may identify a CRC pass for one or more of the candidates (e.g., successfully decoding), and the UE 115 may act in accordance with the received DCI message (e.g., perform a communication scheduled by the DCI message).

In some aspects, a UE 115 may be configured to monitor a control channel according to a control channel monitoring pattern (e.g., PDCCH monitoring pattern) within a slot (e.g., monitoringSymbolsWithinSlot). For example, a PDCCH monitoring pattern within a slot may indicate a first symbol(s) of a CORESET within a slot for PDCCH monitoring. For instance, in the context of a slot including fourteen symbols, a CORESET configured at a UE 115 may be associated with a search space set including three symbols, and a control channel monitoring pattern (e.g., monitoringSymbolsWithinSlot) associated with the search space set may be configured as "01000010001000." In this example, the UE 115 may be configured to determine that there are three monitoring occasions (e.g., PDCCH candidates) within each slot that the search space set exists. Moreover, the UE 115 may be configured to determine that the three monitoring occasions begin at the second, seventh, and eleventh symbols of each respective slot that the search space exists.

In some aspects, multiple search space sets and/or multiple PDCCH candidates may be linked together in different search space sets (e.g., associated with one another) for possible repetitions of the same control channel transmission (e.g., repetitions of DCI). PDCCH candidates which are linked together may be used to transmit/receive repetitions of the same control message. In other words, PDCCH candidates may be linked together for "PDCCH repetitions." In the context of PDCCH repetitions, the payload (e.g., DCI payload) received within two PDCCH candidates (e.g., two PDCCH repetitions) may be the same. For example, a first PDCCH candidate may be related to, or linked with, a second PDCCH candidate. In this example, a first repetition of DCI may be transmitted in the first PDCCH candidate, and a second repetition of DCI may be transmitted in the second PDCCH candidate, where the first and second repetitions of DCI are the same. In this example, a UE 115 may receive and/or decode only the first repetition of DCI or only the second repetition of DCI. Additionally or alternatively, the UE 115 may receive and/or decode both the first and second repetitions of DCI by performing soft-combining of the first and second repetitions of DCI, and the UE may be aware of the linking before decoding. In some aspects, related/linked PDCCH candidates may have the same aggregation level (e.g., same number of CCEs).

In some wireless communications systems which support SFN communications, a single PDCCH transmission (e.g., PDCCH DMRS) may be associated with two TCI states. In particular, for SFN PDCCH transmissions, one CORESET may be activated at UE 115 with two active TCI states. In such cases, each control channel candidate (e.g., PDCCH candidate) of a search space set associated with the CORESET may be associated with the two active TCI states of the CORESET. Moreover, each PDCCH transmission may be associated with two TCI states in all REGs and CCEs of the PDCCH transmission. As compared to linked search space candidates configured for PDCCH repetition, in SFNed PDCCH transmissions (e.g., PDCCH transmissions associated with CORESETs with two or more TCI states), there is no linking between TCI states as each PDCCH candidate is defined in one search space set and one CORESET.

In some aspects, related PDCCH candidates in different search space sets which are associated with corresponding CORESETs may be linked together (e.g., related) for PDCCH repetition. In some cases, two PDCCH candidates with a same candidate index across two related search space sets may be linked or related. In other cases, PDCCH candidates with a same start CCE index may be linked. Moreover, UEs 115 may be configured with sets of linked/related PDCCH candidates which are within a same slot or TTI (e.g., intra-slot PDCCH repetition), sets of linked/related PDCCH candidates which are in different slots (e.g., intra-slot PDCCH repetition), or both.

The wireless communications system 100 may be configured to support inter-carrier scheduling (e.g., cross-carrier scheduling), intra-carrier scheduling (e.g., self-scheduling), or both. Inter-carrier scheduling, or cross-carrier scheduling, refers to cases in which control signaling transmitted/received on a first component carrier (e.g., scheduling component carrier, scheduling cell) is used to schedule communications (e.g., physical downlink shared channel (PDSCH), physical uplink shared channel (PUSCH)) on a different component carrier (e.g., scheduling component carrier, scheduling cell). Conversely, intra-carrier scheduling, or self-scheduling, refers to cases in which control signaling transmitted/received on a component carrier is used to schedule communications on the same component carrier (e.g., same cell).

In some aspects, a search space set may include control channel candidates (e.g., PDCCH candidates) which are configured for self-scheduling, cross-carrier scheduling, or both. The CCEs associated with control channel candidates for different scheduled component carriers (e.g., PDCCH candidates for self-scheduling, PDCCH candidates for cross-carrier scheduling) within a monitoring occasion of a search space set may be separately identified based on a number of candidates for each aggregation level. The number/quantity of candidates for each aggregation level may be configured in a scheduled component carrier, and may be monitored in the scheduling component carrier. For example, a monitoring occasion for a search space set includes a set of PDCCH candidates with an aggregation level of two (e.g., two CCEs for each PDCCH candidate). In this example, the set of PDCCH candidates may include a first subset of PDCCH candidates configured for self-scheduling (e.g., subset of PDCCH candidates with CIF=0), and a second subset of PDCCH candidates for cross-carrier scheduling (e.g., subset of PDCCH candidates with CIF=1). In this regard, a single search space set may include PDCCH candidates which are configured for self-scheduling, cross-carrier scheduling, or both.

As noted previously herein, in some wireless communications systems, downlink control messages (e.g., DCI messages) may schedule other downlink messages (e.g., PDSCH messages) from a base station 105 to a UE 115. The UE 115 may be configured to determine what TCI state (e.g., QCL assumption) is to be used for receiving the scheduled downlink PDSCH message based on the downlink control message. For example, the TCI state used for the downlink control message may also be used for the scheduled downlink PDSCH message. However, some downlink PDSCH messages (e.g., SFN downlink messages) may be associated with multiple TCI states, which complicates the determination for which TCI state is to be used for receiving the scheduled downlink PDSCH message.

Moreover, in some cases described herein, multiple control channel candidates (e.g., PDCCH candidates) may be linked for multiple repetitions of the same downlink control message, where each of the control channel candidates may be associated with one (or multiple) TCI states. Thus, for two linked control channel candidates used for scheduling a same downlink PDSCH message, there may be up to four possible TCI states which potentially could be used for receiving the scheduled downlink message. Some wireless communications systems do not provide a UE 115 with a mechanism for determining which TCI state(s) should be used for PDSCH reception.

Accordingly, aspects of the present disclosure provide techniques for identifying which TCI state(s) a UE 115 is to use for receiving a downlink message when repetitions of a scheduling control message occur in a set of PDCCH candidates linked across two CORESETs that are associated with multiple TCI states. In other words, techniques described herein enable a UE to determine which TCI state(s) are to be applied when multiple CORESETs are linked for control channel repetition, and where at least one CORESET is associated with multiple TCI states (e.g., at least one CORESET is associated with an SFN).

In accordance with aspects of the present disclosure, a UE 115 may receive one or more repetitions of a control message within PDCCH candidates that are linked for control channel repetition, where at least one of the PDCCH candidates is associated with an SFN CORESET including multiple TCI states. The one or more repetitions of the control message may schedule a downlink message at the UE 115, and may not include TCI fields indicating TCI state(s) for the scheduled downlink message. In some aspects, the UE 115 may identify at least one TCI state for monitoring for the scheduled downlink message in accordance with a TCI configuration. The TCI configuration may define a set of rules for identifying the TCI state for the scheduled downlink message, and may be pre-configured at the UE 115, signaled to the UE, or both. In some cases, the UE 115 may identify the TCI state for the scheduled downlink message based on a highest/lowest TCI state ID among the set of linked PDCCH candidates. In other cases, the UE may identify a PDCCH candidate which is associated with a single TCI state, and may use the single TCI state to monitor for the downlink message. In other cases, the UE 115 may identify a CORESET corresponding to the set of linked PDCCH candidates that is associated with one or more TCI states based on the TCI configuration, and may use the one or more TCI state(s) of the identified CORESET for receiving the scheduled downlink message.

Techniques described herein may provide for improved scheduling of downlink messages at a UE 115 in the context of PDCCH repetition. In particular, techniques described herein may enable UEs 115 to determine TCI state(s) for scheduled downlink messages in cases where repetitions of a scheduling downlink control message occur in a set of PDCCH candidates linked across two CORESETs which are associated with multiple TCI states (e.g., SFN CORESETs). As such, techniques described herein may improve reliability of control signaling used for scheduling communications at a UE 115, which may enable more efficient and widespread use of scheduling via SFN CORESETs.

Figure 2:
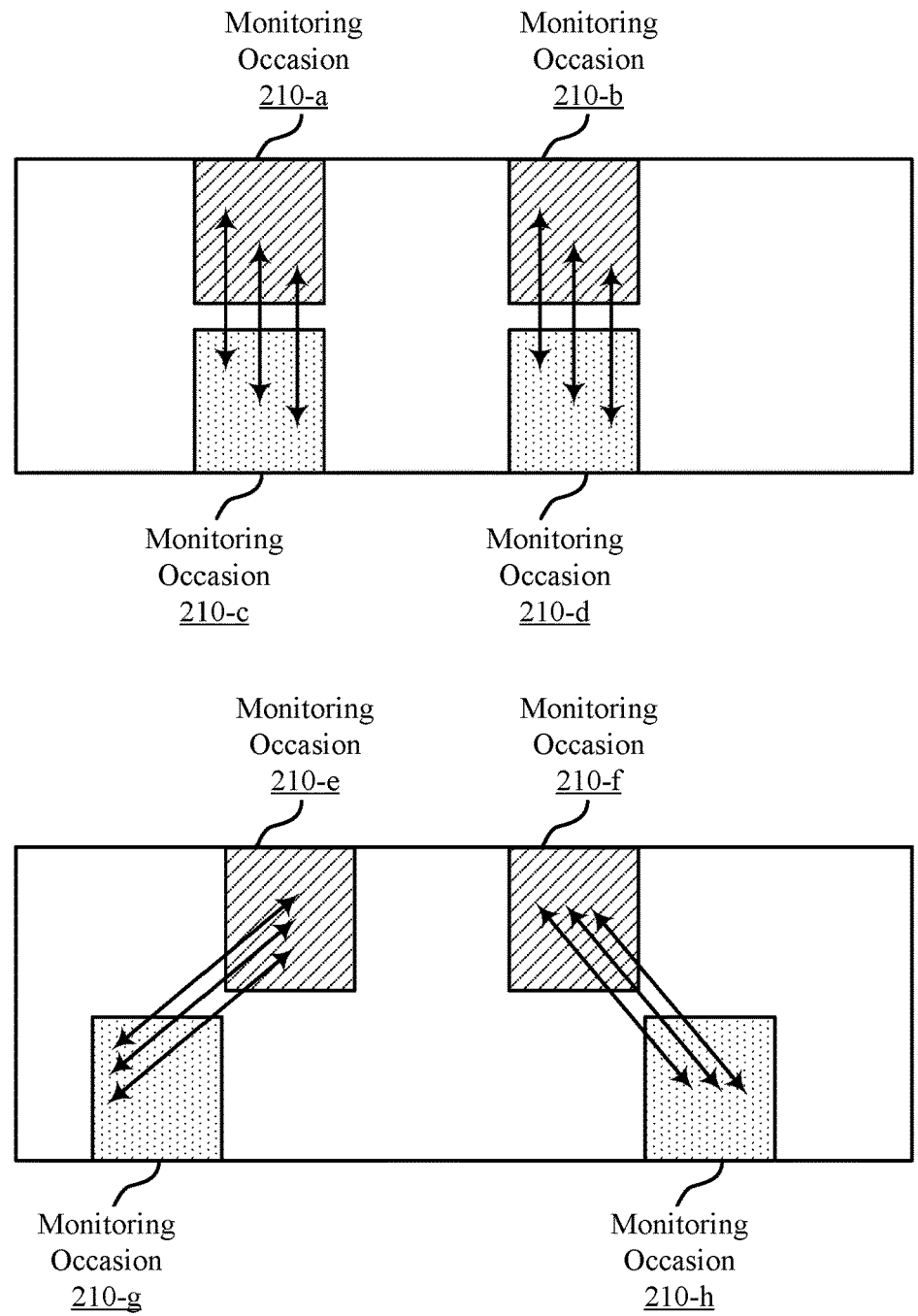
FIG. 2 illustrates an example of a resource configuration that supports techniques for TCI states of SFN control channel repetitions in accordance with aspects of the present disclosure.

FIG. 2 illustrates an example of a resource configuration 200 that supports techniques for TCI states of SFN control channel repetitions in accordance with aspects of the present disclosure. Aspects of the resource configuration 200 may implement, or be implemented by, wireless communications system 100.

As noted previously herein, multiple search space sets 205 may be linked together for control channel repetition (e.g., PDCCH repetition). For example, as shown in the resource configuration 200, a first search space set 205-*a* may be linked to a second search space set 205-*b*. In particular, monitoring occasions 210 associated with the first search space set 205-*a* (e.g., monitoring occasions 210-*a*, 210-*b*, 210-*e*, 210-*f*) may be linked with monitoring occasions 210 associated with the second search space set 205-*b* (e.g., monitoring occasions 210-*c*, 210-*d*, 210-*g*, 210-*h*). In some aspects, related PDCCH candidates in the respective search space sets 205 (e.g., PDCCH candidates within the monitoring occasions 210 of the respective search space sets 205) which are associated with corresponding CORESETs may be linked together (e.g., related) for PDCCH repetition. In other words, linked search space sets (e.g., search space sets 205-*a*, 205-*b*) may be associated with corresponding CORESETs (e.g., first CORESET, second CORESET, respectively). Moreover, the respective CORESETs corresponding to the respective search space sets 205-*a*, 205-*b* may be configured/activated with different TCI states (e.g., each CORESET may be activated with one or two TCI states).

In some cases, two PDCCH candidates with a same candidate index across two related search space sets may be linked or related. In other cases, PDCCH candidates with a same start CCE index may be linked. Moreover, UEs 115 may be configured with sets of linked/related PDCCH candidates which are within a same slot or TTI (e.g., intra-slot PDCCH repetition), sets of linked/related PDCCH candidates which are in different slots (e.g., intra-slot PDCCH repetition), or both.

Associations (e.g., links) between search space sets 205 and/or between PDCCH candidates may be configured (e.g., pre-configured) at the UE 115, signaled (e.g., via RRC signaling) to the UE 115 by the base station 105 (or network device 105), or both. For example, a UE 115 may receive an RRC message which indicates that a first PDCCH candidate in the first search space set 205-*a* is linked with (e.g., related to) a second PDCCH candidate in the second search space set 205-*b*. By way of another example, a UE 115 may receive an RRC message which indicates that the first search space set 205-*a* is linked with (e.g., related to) a second search space set 205-*b* for PDCCH repetition. In this example, PDCCH candidates with the same aggregation level and same candidate index between the first and second search space sets 205 may be linked. In particular, the first search space set 205-*a* and the second search space set 205-*b* may include a first set of PDCCH candidates (first set of monitoring occasions 210) and a second set of PDCCH candidates (second set of monitoring occasions 210), respectively, where the first set of PDCCH candidates are linked to the second set of PDCCH candidates.

In some cases, the first and second sets of monitoring occasions 210 may include the same quantity of monitoring occasions/PDCCH candidates (e.g., one-to-one mapping of monitoring occasions). For example, the monitoring occasion 210-*a* associated with the first search space set 205-*a* may include the same quantities of PDCCH candidates as the monitoring occasion 210-*c* associated with the second search space set 205-*b*. Similarly, the monitoring occasions 210-*b*, 210-*e*, and 210-*f* associated with the first search space set may include the same quantities of PDCCH candidates as the monitoring occasions 210-*d*, 210-*g*, and 210-*h* associated with the second search space set 205-*b*, respectively. Moreover, the first and second search space 205-*a*, 205-*b* sets may be configured with the same quantity of PDCCH candidates for each aggregation level.

In some aspects, aspects of the resource configuration 200 may support techniques for control channel repetition (e.g., PDCCH repetition) in the context of SFN communications, which may enable communications (e.g., PDSCH transmissions) to be scheduled at a UE 115 via control signaling transmitted/received on linked search space sets of a scheduling component carrier. In particular, aspects of the resource configuration 200 may enable UEs 115 to determine TCI state(s) for scheduled downlink messages in cases where repetitions of a scheduling downlink control message occur in a set of PDCCH candidates linked across two search space sets 205 (and/or two CORESETs) which are associated with multiple TCI states (e.g., SFN CORESETs), as will be described in further detail herein with respect to FIGS. 3-4.

Figure 3:
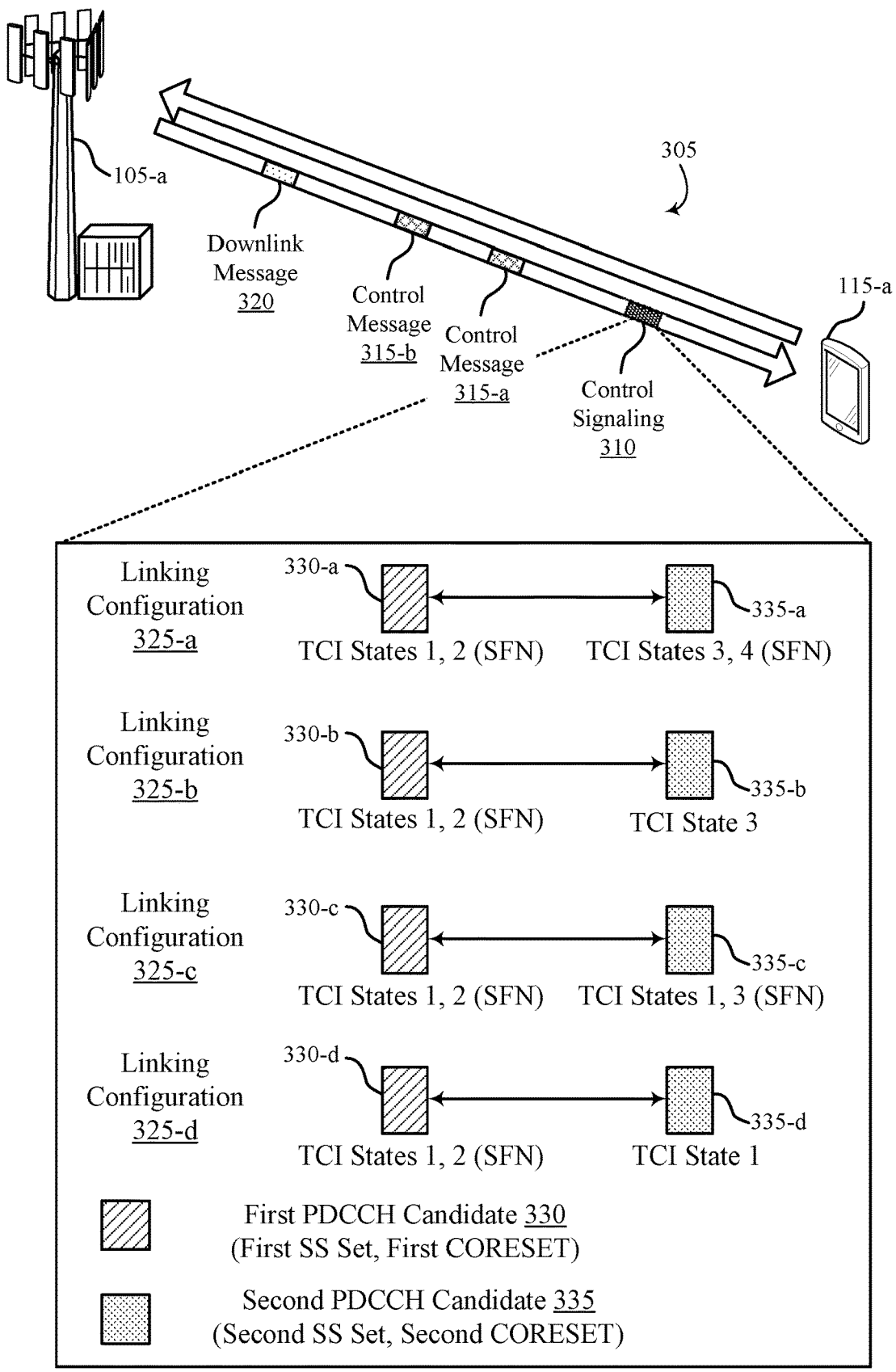
FIG. 3 illustrates an example of a wireless communications system that supports techniques for TCI states of SFN control channel repetitions in accordance with aspects of the present disclosure.

FIG. 3 illustrates an example of a wireless communications system 300 that supports techniques for TCI states of SFN control channel repetitions in accordance with aspects of the present disclosure. In some examples, wireless communications system 300 may implement, or be implemented by, aspects of wireless communications system 100, resource configuration 200, or both. For example, wireless communications system 300 may support techniques which enable a UE 115-*a* to determine TCI state(s) for scheduled downlink messages in cases where repetitions of a scheduling downlink control message occur in a set of PDCCH candidates linked across two CORESETs which are associated with multiple TCI states (e.g., SFN CORESETs), as described in FIGS. 1-2.

The wireless communications system 300 may include a base station 105-*a* (or network device 105-*a*) and a UE 115-*a*, which may be examples base stations 105 and UEs 115 as described with reference to FIG. 1. The UE 115-*a* may communicate with the base station 105-*a* using a communication link 305, which may be an example of an NR or LTE link between the UE 115-*a* and the base station 105-*a*. In some cases, the communication link 305 between the UE 115-*a* and the base station 105-*a* may include an example of an access link (e.g., Uu link) which may include a bi-directional link that enables both uplink and downlink communication. For example, the UE 115-*a* may transmit uplink signals, such as uplink control signals or uplink data signals, to the base station 105-*a* using the communication link 305. Additionally the base station 105-*a* may transmit downlink signals, such as downlink control signals or downlink data signals, to the UE 115-*a* using the communication link 305.

In some aspects, the UE 115-*a* and the base station 105-*b* of the wireless communications system 300 may support techniques for scheduling communications (e.g., downlink messages 320) at the UE 115-*a* using control channel repetition (e.g., PDCCH repetition). In particular, the wireless communications system 300 may support techniques which enables the UE 115-*a* to determine TCI state(s) for scheduled downlink messages 320 in cases where repetitions of a scheduling control message 315 occur in a set of PDCCH candidates linked across two search space sets (and/or two CORESETs) which are associated with multiple TCI states (e.g., SFN CORESETs).

In some cases, downlink control messages 315 (e.g., DCI messages) which schedule downlink messages 320 (e.g., PDSCH messages) from the base station 105-*a* to the UE 115-*a* may indicate TCI states (e.g., QCL assumptions) which are to be used for the scheduled downlink messages 320. In particular, the control message(s) 315 may include a TCI field which indicates which TCI state is to be applied for the downlink message 320 scheduled by the respective control message 315.

However, in some cases, the control message 315 (e.g., DCI message, or other downlink control message) which schedules the downlink message 320 may not include a TCI field. In particular, a DCI message may not be configured with a TCI field, or a DCI format 1_0 may be used (which does not include a TCI field). In such cases, if a scheduling offset between the control message 315 and the scheduled downlink message 320 is larger than a threshold (for QCL-TypeD), the TCI state (e.g., QCL assumption) for the scheduled downlink message 320 may be determined from the TCI state of the scheduling CORESET associated with the control message 315. In other words, if a control message 315 (e.g., DCI message) scheduling a downlink message 320 does not include a TCI state, the UE 115-*a* may assume that the TCI state for the scheduled downlink message 320 is identical to the TCI state for the CORESET used for the control message 315 within the active BWP of the serving cell.

Moreover, if the downlink message 320 (e.g., PDSCH message) is scheduled by a control message 315 within a PDCCH candidate which is linked to another PDCCH candidate for control channel repetition, and the control message 315 does not include a TCI field, the TCI state (e.g., QCL assumption) for the scheduled downlink message 320 may be based on the CORESET with the lowest CORESET identifier. In other words, a first PDCCH candidate associated with a first CORESET may be linked to a second PDCCH candidate associated with a second CORESET for control channel repetition. In such cases, if the UE 115-*a* receives a control message 315 (e.g., DCI message) in the first or second PDCCH candidate and the control message 315 does not include a TCI field, and the scheduling offset for the scheduled downlink message is greater than or equal to a threshold (e.g., timeDurationforQCL), the UE 115-*a* may be configured to determine/assume the TCI state for the scheduled downlink message 320 based on the CORESET with the lower CORESET identifier (CORESETId) among the first and second CORESETs.

In some wireless communications systems, such as wireless communications system 300 which supports SFN communications, a single PDCCH transmission (e.g., PDCCH DMRS) may be associated with two TCI states. In particular, for SFN PDCCH transmissions, one CORESET may be activated at the UE 115-*a* with two active TCI states, such that the CORESET (e.g., SFN CORESET) is associated with the two TCI states. For the purposes of the present disclosure, the terms "SFN CORESET," "SFNed CORESET," and like terms, may be used to refer to a CORESET which is associated with multiple TCI states. Similarly, the terms "non-SFN CORESET," "non-SFNed CORESET," and like terms, may be used to refer to a CORESET which is associated with a single TCI state. In such cases, each control channel candidate (e.g., PDCCH candidate) of a search space set associated with the CORESET may be associated with the two active TCI states of the CORESET. Moreover, each PDCCH transmission may be associated with two TCI states in all REGs and CCEs of the PDCCH transmission. As compared to linked search space candidates configured for PDCCH repetition, in SFNed PDCCH transmissions (e.g., PDCCH transmissions associated with CORESETs with two or more TCI states), there is no linking between search space sets or CORESETs, as each PDCCH candidate is defined in one search space set and one CORESET.

In some cases, the use of CORESETs associated with multiple TCI states (e.g., SFN CORESETs) may complicate the determination of TCI states which are to be used for scheduled downlink messages 320. In particular, when a control message 315 associated with an SFN CORESET (e.g., CORESET associated with two TCI states) schedules a downlink message 320, but does not include a TCI field, it may be unclear which TCI state is to be used for the scheduled downlink message 320.

For example, in some cases where a control message 315 without a TCI field schedules a downlink message 320 which is associated with a CORESET with multiple TCI states, the UE 115-a may be configured to assume one of the TCI states of the SFN CORESET for the scheduled downlink message 320. The UE 115-a may assume the TCI state with the lower/higher TCI state identifier, or the first/second activated TCI state (where the first/second activated TCI state is based on the order of the two activated TCI states for the SFN CORESET). In such cases, the scheduled downlink message may be transmitted/received using one TCI state (e.g., single-TRP). In other cases, the UE 115-a may assume both TCI states of the SFN CORESET for the scheduled downlink message 320. In such cases, the downlink message 320 may be transmitted/received using multiple TCI states (e.g., multi-TRP). Moreover, the scheduled downlink message 320 may include either an SFN downlink message (e.g., each DMRS port of the downlink message 320 is associated with two TCI states), and/or an SDM/FDM/TDM downlink message 320 in which different layers, resource blocks, or symbols of the downlink message 320 are transmitted/received with different TCI states.

At a high level, the use of SFN CORESETs to schedule downlink messages 320 at the UE 115-a may complicate scheduling, as there are multiple candidate TCI states associated with the SFN CORESET which may be used for the scheduled downlink message 320. The presence of multiple candidate TCI states which may be used for a scheduled downlink message 320 is further complicated in the context of control channel repetition, where CORESETs and/or PDCCH candidates are linked for multiple repetitions of a control message 315.

For example, referring to a first linking configuration 325-a, a first control channel candidate (e.g., first PDCCH candidate 330-a) within a first search space set of a first CORESET may be linked for control channel repetition to a second control channel candidate (e.g., second PDCCH candidate 335-a) within a second search space set of a second CORESET. In this regard, the first PDCCH candidate 330-a and the second PDCCH candidate 335-a may be linked for multiple repetitions of a same control message 315 that schedules the same downlink message 320 at the UE 115-a. For instance, the PDCCH candidates 330-a, 335-a may be linked such that a first repetition of control message 315-a may be received in the PDCCH candidate 330-a, and a second repetition of control message 315-b may be received in the PDCCH candidate 335-a, where each repetition of the control message 315-a, 315-b includes the same data payload, and schedules a downlink message 320 at the UE 115-a.

Continuing with reference to linking configuration 325-a, the first PDCCH candidate 330-a may be associated with a first CORESET (e.g., SFN CORESET) which is associated with two TCI states (e.g., TCI state 1, TCI state 2). Similarly, the second PDCCH candidate 335-a may be associated with a second CORESET (e.g., SFN CORESET) which is associated with two TCI states (e.g., TCI state 3, TCI state 4). In this example, in cases where control messages 315 (e.g., DCI messages) received in the respective PDCCH candidates 330-a, 335-a do not include TCI fields, it may be unclear which TCI state (e.g., TCI states 1, 2, 3, and/or 4) is to be used for the scheduled downlink message 320.

Similar issues when determining TCI states arise in linking configurations 325-b, 325-c, and 325-d, in which one or more of the PDCCH candidates 330, 335 are associated with multiple TCI states (e.g., associated with SFN CORESETs). As may be seen in FIG. 3, in each of linking configurations 325-a through 325-d, at least one linked PDCCH candidate 330, 335 is associated with two TCI states (e.g., at least one PDCCH candidate 330, 335 is associated with an SFN CORESET). In particular, each of the PDCCH candidates 330-a, 330-b, 330-c, and 330-d are associated with an SFN CORESET. Moreover, the PDCCH candidates 335-a and 335-c of the linking configurations 325-a and 325-c, respectively, are associated with SFN CORESETs.

In cases where repetitions of a control message 315 which schedule a downlink message 320 are received within any of PDCCH candidates 330, 335 of linking configurations 325-a through 325-d, the scheduling control message 315 may be associated with, or based on, two, three, or four different TCI states. For example, referring to the third linking configuration 325-c, the UE 115-a has to be able to determine whether a downlink message 320 scheduled via repetition(s) of a control message 315 received within PDCCH candidate 330-c and/or PDCCH candidate 335-c will be transmitted/received using TCI state 1, 2, and/or 3. As such, the UE 115-a may require additional signaling or configurations to be able to determine which TCI state is to be used for the scheduled downlink message 320.

Accordingly, the wireless communications system 300 may support techniques which enable the UE 115-a and/or the base station 105-a to determine which TCI state(s) (e.g., QCL assumption(s)) is to be applied for a scheduled downlink message 320 when the scheduling control message 315 does not include a TCI field and is based on combinations of PDCCH repetition and SFN PDCCH. In other words, techniques described herein may enable the UE 115-a to determine which TCI state(s) apply to a scheduled downlink message 320 when the downlink message 320 is scheduled by a DCI (e.g., control message 315) which is received within PDCCH candidates 330, 335 that are linked for repetitions, and where at least one PDCCH candidate 330, 335 is associated with two TCI states (e.g., at least one of the PDCCH candidates 330, 335 is SFN PDCCH).

For example, the UE 115-a may receive, from the base station 105-a, control signaling 310 which indicates a first CORESET associated with a first set of one or more TCI states and a second CORESET which is associated with a second set of one or more TCI states. In this regard, the control signaling 310 may configure the UE 115-a with multiple CORESETs including sets of PDCCH candidates 330, the UE 115-b is to monitor.

In some aspects, the first CORESET and the second CORESET may be linked for control channel repetition. For example, referring to the first linking configuration 325-a, a first control channel candidate (e.g., first PDCCH candidate 330-a) of the first CORESET may be linked for control channel repetition to a second control channel candidate (e.g., second PDCCH candidate 335-a) of the second CORESET. By way of another example, referring to the second linking configuration 325-b, a first PDCCH candidate 330-*b* of the first CORESET may be linked for control channel repetition to a second PDCCH candidate 335-*b* of the second CORESET.

In some aspects, the first CORESET, the second CORESET, or both, may be associated with multiple TCI states. In other words, the first and/or second CORESET may include an SFN CORESET. For example, referring again to the first linking configuration 325-*a*, the first set of TCI states corresponding to the first CORESET (e.g., first PDCCH candidate 330-*a*) may include two TCI states (e.g., TCI states 1 and 2), and the second set of TCI states corresponding to the second CORESET (e.g., second PDCCH candidate 335-*a*) may include two TCI states (e.g., TCI states 3 and 4). By way of another example, referring to the second linking configuration 325-*b*, the first set of TCI states corresponding to the first CORESET (e.g., first PDCCH candidate 330-*b*) may include two TCI states (e.g., TCI states 1 and 2), whereas the second set of TCI states corresponding to the second CORESET (e.g., second PDCCH candidate 335-*b*) may include a single TCI state (e.g., TCI state 3). In this regard, at least one set of TCI states corresponding to the first CORESET (e.g., PDCCH candidates 330) and the second CORESET (e.g., PDCCH candidates 335) may include two or more TCI states.

In some aspects, the UE 115-*a* may receive, from the base station 105-*a*, one or more repetitions of a control message 315 which schedule a downlink message 320 (e.g., PDSCH transmission) from the base station 105-*a* to the UE 115-*a*. The repetitions of the control message 315 may include repetitions of a DCI message (e.g., DCI formats 0_1, 0_2, 1_1, and/or 1_2).

In some aspects, the UE 115-*a* may receive the one or more repetitions of the control message 315 within PDCCH candidates 330, 335 which are linked for control channel repetition. For example, in cases where the control signaling 310 configures the UE 115-*a* with the first linking configuration 325-*a*, the UE 115-*a* may receive a first repetition of the control message 315-*a* within the first PDCCH candidate 330-*a*, and may additionally or alternatively receive a second repetition of the control message 315-*b* within the second PDCCH candidate 335-*a*. By way of another example, in cases where the control signaling 310 configures the UE 115-*a* with the second linking configuration 325-*b*, the UE 115-*a* may receive a first repetition of the control message 315-*a* within the first PDCCH candidate 330-*b*, and may additionally or alternatively receive a second repetition of the control message 315-*b* within the second PDCCH candidate 335-*b*. In such cases, each repetition of the control message 315 may schedule the same downlink message 320, and may thereby include the same payload (e.g., same DCI control payload).

In some cases, the UE 115-*a* may receive only one of the first or second repetition of the control message 315 (e.g., only control message 315-*a* or control message 315-*b*). Where the UE 115-*a* receives only the first or second repetition of the control message 315-*a*, 315-*b*, the UE 115-*a* may demodulate/decode the single received repetition of the control message 315.

In other cases, the UE 115-*a* may receive both the first and second repetitions of the control message 315-*a*, 315-*b*. In such cases, the UE 115-*a* may demodulate/decode only one of the first or second repetitions of the control message 315. Additionally or alternatively, the UE 115-*a* may combine the first and second repetitions of the control message 315. For example, the UE 115-*a* may perform soft combining of the first and second repetitions of the control message 315-*a*, 315-*b*. In some aspects, the UE 115-*b* may perform soft combining (e.g., perform one or more soft combining procedures) in order to demodulate/decode the repetitions of the control message 315-*a*, 315-*b*. In particular, the UE 115-*b* may perform soft combining of a first signal (e.g., first repetition of the control message 315-*a*) with a second signal (e.g., second repetition of the control message 315-*b*).

In some cases, as noted previously herein, the repetition(s) of the control message 315-*a*, 315-*b* may include TCI fields which indicate which TCI state(s) is to be used for the scheduled downlink message 320. In such cases, the UE 115-*a* may be configured to apply the TCI state(s) indicated in the TCI fields in order to monitor for and receive the downlink message 320.

However, in other cases, the repetition(s) of the control message may not include TCI fields. In this regard, the UE 115-*a* and/or the base station 105-*a* may identify that the one or more repetitions of the control message 315-*a*, 315-*b* do not indicate TCI fields for the downlink message 320 scheduled by the repetitions of the control message 315.

In cases where the UE 115-*a* does not receive an explicit indication of the TCI states which are to be used for the scheduled downlink message 320 via the repetitions of the control message 315-*a*, 315-*b*, the control signaling 310, and/or additional control signaling, the UE 115-*a* may be configured to determine which TCI state(s) is to be applied for the scheduled downlink message 320 using one or more TCI configurations. In some cases, the base station 105-*a* may configure the UE 115-*a* (e.g., via RRC signaling, control signaling 310) with one or more TCI configurations which are to be used to identify/determine TCI state(s) for scheduled downlink messages 320. Additionally, or alternatively, the UE 115-*a* may be pre-configured (e.g., without explicit signaling from the base station 105-*a*) with one or more TCI configurations.

In some aspects, each "TCI configuration" may define a set of rules or parameters which are to be used to identify which TCI state(s) is to be used for a scheduled downlink message 320 in cases where the TCI state for the scheduled downlink message 320 is not explicitly indicated. In particular, the UE 115-*a* may be configured to use TCI configurations to determine TCI state(s) for downlink messages 320 which are scheduled by control messages 315 (DCI) which are received in PDCCH candidates 330, 335 associated with two CORESETs which are linked for control channel repetition, where at least one of the CORESETs is associated with two TCI states (e.g., at least one PDCCH candidates 330, 335 is associated with SFN CORESET), and the TCI fields are not present in the control messages 315. As such, the UE 115-*b* may use the TCI configuration to identify/select one or more TCI states associated with the first CORESET, the second CORESET, or both, which are associated with the control message 315 scheduling the downlink message 320 which will be used to transmit/receive the scheduled downlink message 320.

The downlink message 320 scheduled by the one or more repetitions of the control message 315-*a*, 315-*b* may be transmitted/received via one or more TCI states. For example, in some cases, the downlink message 320 may include a single-TRP PDSCH message which is transmitted/received using one TCI state. In other cases, the downlink message 320 may include a multi-TRP PDSCH message which is transmitted/received using two TCI states. In this regard, in some implementations, the TCI state/QCL assumption for the scheduled downlink message 320 may be based on only one TCI state of the two or more TCI states associated with the first PDCCH candidate 330 and the second PDCCH candidate 335. For example, referring to the first linking configuration 325-a, the TCI state for the scheduled downlink message 320 may be based on one of TCI states 1, 2, 3, or 4. In other implementations, the TCI state/QCL assumption for the scheduled downlink message 320 may be based on multiple (e.g., two) TCI states of the two or more TCI states associated with the first PDCCH candidate 330 and the second PDCCH candidate 335. For example, referring to the first linking configuration 325-a, the TCI states for the scheduled downlink message 320 may be based on two or more TCI states from TCI states 1, 2, 3, or 4.

In some implementations, in accordance with a TCI configuration, the UE 115-a may identify one or more TCI states associated with the first and/or second CORESET which will be used for reception of the scheduled downlink message 320 based on a highest/lowest TCI state identifier (e.g., highest/lowest TCI state ID). For example, referring to linking configuration 325-a, the UE 115-a may identify/select the highest/lowest TCI state(s) out of the TCI states 1, 2, 3, and 4 for the downlink message 320 in accordance with the TCI configuration. By way of another example, referring to linking configuration 325-b, the UE 115-a may select the two TCI states with the highest/lowest TCI state identifiers out of the TCI states 1, 2, and 3 (e.g., highest/lowest TCI state IDs) for the downlink message 320 in accordance with the TCI configuration.

In accordance with some other TCI configurations, the UE 115-a may identify/select a TCI state for reception of the scheduled downlink message 320 which is common to both CORESETs (e.g., included within both sets of TCI states). For example, referring to the third linking configuration 325-c and/or the fourth linking configuration 325-d, the TCI configuration may cause the UE 115-a to identify/select TCI state 1 for the scheduled downlink message 320 based on TCI state 1 being associated with both the first CORESET (e.g., first PDCCH candidate 330-c) and the second CORESET (e.g., second PDCCH candidate 335-c). In this example, the downlink message 320 may include one TCI state/QCL assumption (e.g., single-TRP PDSCH).

In other examples, in accordance with some TCI configurations, the UE 115-a may first select one of the two CORESETS (e.g., one of the first CORESET and/or second CORESET), and may then identify/select one or more TCI states for reception of the scheduled downlink message 320 based on the selected CORESET. For example, referring to the first linking configuration 325-a, the UE 115-a may first select one of the first CORESET (e.g., first PDCCH candidate 330-a) or the second CORESET (e.g., second PDCCH candidate 335-a), and then may identify the one or more TCI states based on the identified CORESET (e.g., identify TCI state 1 or 2 if the first CORESET is identified, and identify TCI state 3 or 4 if the second CORESET is identified).

In other implementations, and in accordance with some TCI configurations, the UE 115-a may select the CORESET which is associated with two TCI states (e.g., select the SFN CORESET). For example, referring to the second linking configuration 325-a, the UE 115-a may select the first CORESET based on the first CORESET being associated with two TCI states. In accordance with other TCI configurations, the UE 115-a may select the CORESET which is associated with a single TCI state. For example, referring again to the second linking configuration 325-a, the UE 115-a may select the second CORESET based on the second CORESET being associated with a single TCI state.

In accordance with some other TCI configurations, the UE 115-a may identify which of the two CORESETs to select based on the CORESET with the highest/lowest CORESET identifier (e.g., CORESET ID). For example, referring to the second linking configuration 325-b, the UE 115-a may select the first CORESET or the second CORESET based on which of the first or second CORESET has the highest/lowest CORESET ID. In other cases, the UE 115-a may identify which of the two CORESETs to select based on the search space set identifiers of the respective PDCCH candidates 330, 335. In such cases, the UE 115-a may identify which of the two CORESETs to select based on the search space set with the highest/lowest search space set identifier (e.g., search space set ID). For example, referring again to the second linking configuration 325-b, the UE 115-a may select the first CORESET or the second CORESET based on which of the first or second search space sets has the highest/lowest search space set ID.

Upon selecting/identifying a CORESET from the first CORESET and the second CORESET, the UE 115-a may be configured to identify/select one or more TCI states for reception of the scheduled downlink message 320 based on the selected CORESET. In cases where the selected CORESET is associated with a single TCI state, and the downlink message 320 is associated with a single TCI state (e.g., single-TRP PDSCH), the TCI state corresponding to the selected CORESET may be used for reception of the scheduled downlink message 320. For example, if the scheduled downlink message 320 is to be transmitted/received using one TCI state/QCL assumption (e.g., single-TRP PDSCH), and the TCI configuration causes the UE 115-a to select the second CORESET in the second linking configuration 325-b, the UE 115-a may identify TCI state 3 as the TCI state for reception of the downlink message 320. Otherwise, if the selected CORESET is associated with two TCI states, the UE 115-a may identify/select between the two TCI states based on the TCI state with the highest/lowest TCI state identifier, or based on the first/second TCI state indicated in additional control signaling (e.g., MAC-CE, RRC). For example, if the scheduled downlink message 320 is to be transmitted/received using one TCI state/QCL assumption (e.g., single-TRP PDSCH), and the TCI configuration causes the UE 115-a to select the first CORESET in the second linking configuration 325-b, the UE 115-a may identify the TCI state for reception of the downlink message 320 based on which of the TCI states 1 and 2 has the highest/lowest TCI state identifier, or based on a TCI identifier corresponding to one of the TCI states 1 and 2 which was indicated to the UE 115-a via control signaling (e.g., MAC-CE, RRC).

In some implementations, when the selected/identified CORESET has two TCI states (e.g., SFN CORESET) and pre-compensation is used, the QCL-Type of the two TCI states corresponding to the selected CORESET may be used to select one of the TCI states for reception of the downlink message 320 (e.g., single-TRP PDSCH). Pre-compensation may refer to whether or not the respective CORESET has been configured/adjusted to account for Doppler effect. In particular, when a CORESET is associated with SFN, there are two different modes which may be supported, a mode without pre-compensation and a mode with pre-compensation. In the mode without pre-compensation, both TCI states for the respective CORESET are QCL-Type A. Comparatively, in the mode with pre-compensation, there are two Variants. In Variant 1 with pre-compensation (e.g., TRP-specific TRS), the TCI states of the respective CORESET include a QCL-TypeA and a different/new QCL Type (e.g., average delay, delay spread). In Variant 2 with pre-compensation (e.g., SFN TRS+one TRP TRS), the TCI states of the respective CORESET include a QCL-TypeB and a different/new QCL Type (e.g., average delay, delay spread).

Accordingly, if the scheduled downlink message 320 is to be transmitted/received using one TCI state/QCL assumption (e.g., single-TRP PDSCH), and the TCI configuration causes the UE 115-a to select a CORESET with two TCI states (e.g., SFN CORESET), the UE 115-a may select a TCI state from the two TCI states of the CORESET based on the QCL-Types of the two TCI states. For instance, in some implementations, the anchor TCI state (with QCL-TypeA or QCL-TypeB) may be used, in which case the downlink message 320 may have the same Doppler shift/spread as the reference signal source of the selected anchor TCI state (QCL-TypeA or B). In other implementations, the non-anchor TCI state (with time domain property for average delay or delay spread) may be used, in which case the downlink message 320 may have the same average delay or delay spread Doppler shift/spread as the reference signal source of the new/different non-anchor TCI state (for the pre-compensation case).

Conversely, in cases where the selected CORESET is associated with two TCI states, and reception of the downlink message 320 is associated with two TCI states (e.g., multi-TRP PDSCH), both TCI states corresponding to the selected CORESET may be used for the scheduled downlink message 320. For example, if the scheduled downlink message 320 is to be transmitted/received using two TCI states/ QCL assumptions (e.g., multi-TRP PDSCH), and the TCI configuration causes the UE 115-a to select the first CORESET in the second linking configuration 325-b, the UE 115-a may identify TCI states 1 and 2 as the TCI states for the downlink message 320.

Otherwise, if the scheduled downlink message 320 is to be transmitted/received using two TCI states (e.g., multi-TRP PDSCH) and the TCI configuration causes the UE 115-a to select the CORESET with a single TCI configuration, the TCI configuration of the selected CORSET may be used for reception of the downlink message 320, and the UE 115-a may select an additional TCI state from the other linked CORESET (e.g., the non-selected CORESET). For example, if the scheduled downlink message 320 is to be transmitted/received using two TCI states, and the TCI configuration causes the UE 115-a to select the second CORESET in the second linking configuration 325-b (e.g., non-SFN CORESET), the UE 115-a may identify TCI state 3 as one of the TCI states for reception of the downlink message 320, and may identify one of TCI states 1 and 2 as the other TCI state for reception of the downlink message 320. In this example, the UE 115-a may identify/select between TCI states 1 and 2 based on which of the TCI states 1 and 2 has the highest/lowest TCI state identifier, or based on a TCI identifier corresponding to one of the TCI states 1 and 2 which was indicated to the UE 115-a via control signaling (e.g., MAC-CE, RRC).

In some implementations, the quantity of TCI states which are to be used for transmitting/receiving the scheduled downlink message 320, and therefore the quantity of TCI states which must be identified, may be indicated to the UE 115-a via RRC signaling (e.g., control signaling 310). In other cases, the quantity of TCI states which are to be used for transmitting/receiving the scheduled downlink message 320 may be based on which CORESET is selected/identified. For example, if the CORESET selected/identified using the TCI configuration has one TCI state (e.g., non-SFN CORESET), the scheduled downlink message 320 may be associated with a single TCI state (e.g., single-TRP PDSCH). Conversely, if the CORESET selected/identified using the TCI configuration has two TCI state (e.g., SFN CORESET), the scheduled downlink message 320 may be associated with two TCI states (e.g., multi-TRP PDSCH).

In other cases, the quantity of TCI states which are to be used for transmitting/receiving the scheduled downlink message 320 (and therefore the quantity of TCI states which must be identified) may be based on a TCI state activation of the scheduled downlink message. In particular, the quantity of TCI states which are to be used for transmitting/ receiving the scheduled downlink message 320 may be based on mappings between TCI codepoints and TCI states for the respective CORESETs. MAC-CE messages activating TCI states for downlink messages 320 may map each TCI codepoint to one or two TCI states. If each TCI codepoint is mapped to one TCI state, then multi-TRP PDSCHs are not enabled, and only single-TRP PDSCHs are enabled. For example, if at least one TCI codepoint at the UE 115-a is mapped to two TCI states (e.g., condition for enabling multi-TRP PDSCHs), the scheduled downlink message 320 may be associated with two TCI states. Otherwise, if no TCI codepoint at the UE 115-a is mapped to two TCI states, the scheduled downlink message 320 may be associated with a single TCI state. Moreover, the TCI states identified for transmitting/receiving the downlink message 320 may be conditioned on a time offset between reception of the control message 315 and the scheduled downlink message 320 being greater than or equal to a threshold time interval (e.g., threshold timeDurationForQCL) in the case of QCL-TypeD for FR2.

Upon identifying the one or more TCI states for receiving the downlink message 320 using the TCI configuration, the UE 115-a may monitor for the downlink message using the one or more identified TCI states. Moreover, the base station 105-a may transmit the downlink message 320 (and the UE 115-a may receive the downlink message 320) using the identified TCI state(s).

Techniques described herein may provide for improved scheduling of downlink messages at the UE 115-a in the context of PDCCH repetition. In particular, techniques described herein may enable the UE 115-a to determine TCI state(s) for scheduled downlink messages 320 in cases where repetitions of a scheduling control message 315 occur in a set of PDCCH candidates 330, 335 linked across two CORESETs which are associated with multiple TCI states (e.g., SFN CORESETs). As such, techniques described herein may improve reliability of control signaling used for scheduling communications at the UE 115-a, which may enable more efficient and widespread use of scheduling via SFN CORESETs.

Figure 4:
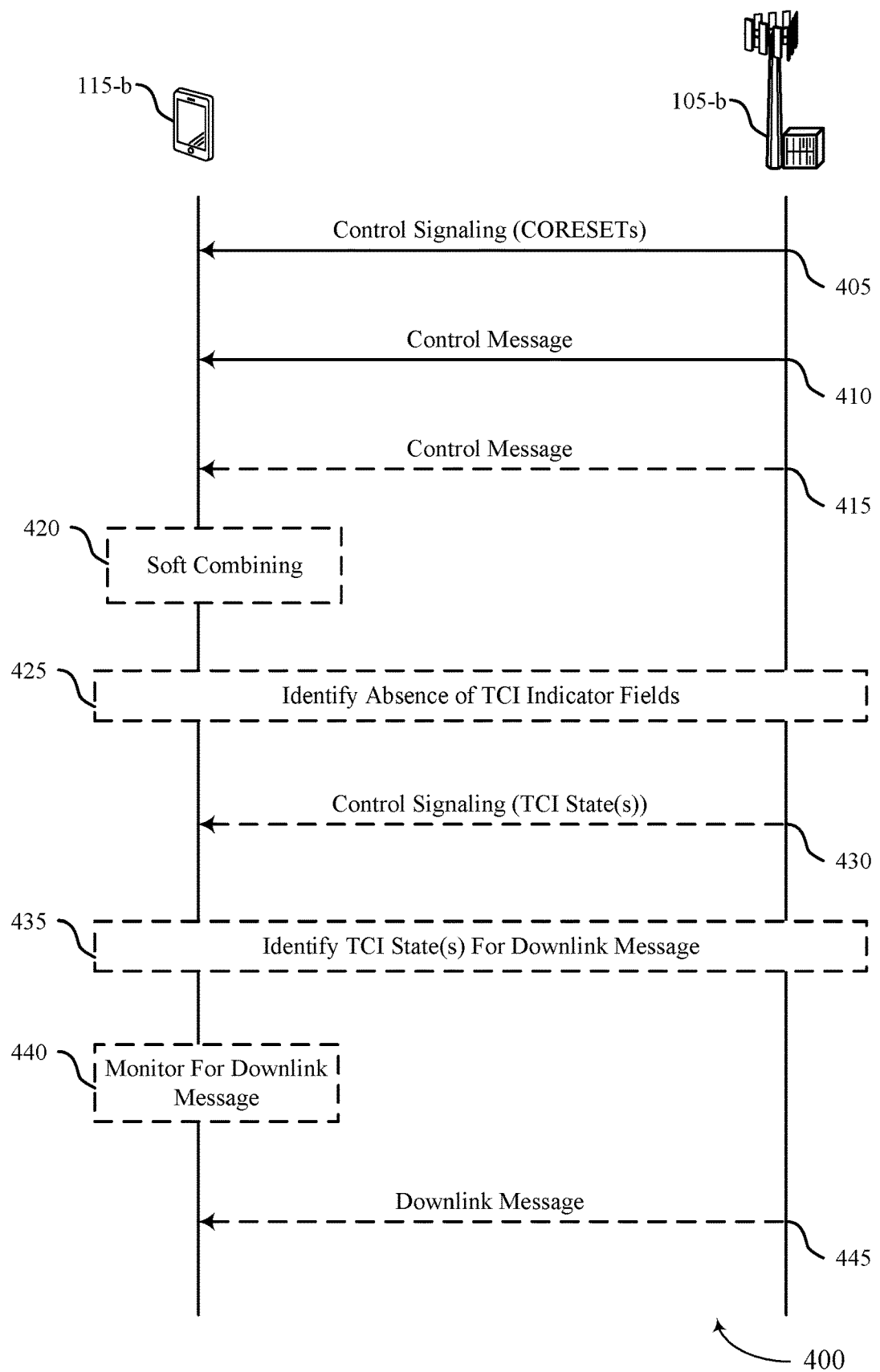
FIG. 4 illustrates an example of a process flow that supports techniques for TCI states of SFN control channel repetitions in accordance with aspects of the present disclosure.

FIG. 4 illustrates an example of a process flow 400 that supports techniques for TCI states of SFN control channel repetitions in accordance with aspects of the present disclosure. In some examples, process flow 400 may implement, or be implemented by, aspects of wireless communications systems 100, resource configuration 200, wireless communications system 300, or any combination thereof. For example, the process flow 400 may illustrate a UE 115-b receiving control signaling which configures PDCCH candidates linked across two CORESETs associated with multiple TCI states, receiving one or more repetitions of a control message within the linked PDCCH candidates which schedule a downlink message at the UE 115-b, identifying at least one TCI state for the scheduled downlink message, and monitoring for the downlink message based on the identified TCI state(s), as described with reference to FIGS. 1-3.

In some cases, process flow 400 may include a UE 115-b and a base station 105-b (or network device 105-b), which may be examples of corresponding devices as described herein. In particular, the UE 115-*b* and the base station 105-*b* illustrated in FIG. 4 may include examples of the UE 115-*a* and the base station 105-*a* illustrated in FIG. 3.

In some examples, the operations illustrated in process flow 400 may be performed by hardware (e.g., including circuitry, processing blocks, logic components, and other components), code (e.g., software) executed by a processor, or any combination thereof. Alternative examples of the following may be implemented, where some steps are performed in a different order than described or are not performed at all. In some cases, steps may include additional features not mentioned below, or further steps may be added.

At 405, the UE 115-*b* may receive, from the base station 105-*b*, control signaling which indicates a first CORESET associated with a first set of TCI states and a second CORESET which is associated with a second set of TCI states. In this regard, the control signaling may configure the UE 115-*b* with multiple CORESETs including sets of PDCCH candidates which the UE 115-*b* is to monitor.

In some aspects, the first CORESET, the second CORESET, or both, may be associated with multiple TCI states. In other words, the first and/or second CORESET may include an SFN CORESET. For example, the first set of TCI states corresponding to the first CORESET and/or the second set of TCI states corresponding to the second CORESET may include two or more TCI states, such that the first and/or second CORESET is associated with an SFN. In some aspects, the first CORESET and the second CORESET may be linked for control channel repetition. For example, a first control channel candidate (e.g., first PDCCH candidate) of the first CORESET may be linked for control channel repetition to a second control channel candidate (e.g., second PDCCH candidate) of the second CORESET.

At 410, the UE 115-*b* may receive, from the base station 105-*b*, a first control message (e.g., first repetition of a control message). In some aspects, the control message may schedule a downlink message (e.g., PDSCH transmission) from the base station 105-*b* to the UE 115-*b*. The control message may include a DCI message (e.g., DCI formats 0_1, 0_2, 1_1, and/or 1_2).

In some aspects, the UE 115-*b* may receive the first control message (e.g., first repetition of the control message) within a PDCCH candidate of a search space set associated with the first CORESET. Moreover, the UE 115-*b* may receive the first repetition of the control message within a first PDCCH candidate of a first search space set which is linked to a second PDCCH candidate of a second search space which is linked to the first search space set for control channel repetition. As such, the UE 115-*b* may receive the first repetition of the control message at 410 based on receiving the control signaling 405.

At 415, the UE 115-*b* may receive, from the base station 105-*b*, a second control message (e.g., second repetition of the control message). In some aspects, the second control message may schedule a downlink message from the base station 105-*b* to the UE 115-*b*. The control message may include a DCI message (e.g., DCI formats 0_1, 0_2, 1_1, and/or 1_2). The first and second control messages (e.g., first and second repetitions of the control message) received at 410 and 415, respectively, may each schedule the same downlink message, and may include the same data payload.

In some aspects, the UE 115-*b* may receive the second control message (e.g., second repetition of the control message) within a PDCCH candidate of the second search set of the second CORESET which is linked for control channel repetition to the first decoding candidate of the first search space of the first CORESET. In other words, the UE 115-*a* may receive the first repetition of the control message at 410 and the second repetition of the control message at 415 within PDCCH candidates which are linked for control channel repetition. As such, the UE 115-*b* may receive the second repetition of the control message at 415 based on receiving the control signaling at 405, receiving the first control message at 410, or both.

In some cases, the UE 115-*b* may receive both the first and second repetitions of the control message at 410 and 415, respectively. In other cases, the UE 115-*b* may receive only one of the first or second repetition of the control message. In cases where the UE 115-*b* receives only the first or second repetition of the control message, the UE 115-*b* may demodulate/decode the single received repetition of the control message. In other cases where the UE 115-*b* receives both the first and second repetitions of the control message, the UE 115-*b* may demodulate/decode only one of the first or second repetitions of the control message. Additionally or alternatively, the UE 115-*b* may combine the first and second repetitions of the control message, as described at 420 of process flow 400.

At 420, the UE 115-*b* may perform soft combining of the first and second repetitions of the control message received at 410 and 415. In some aspects, the UE 115-*b* may perform soft combining (e.g., perform one or more soft combining procedures) in order to demodulate/decode the repetitions of the control message. In particular, the UE 115-*b* may perform soft combining of a first signal (e.g., first repetition of the control message) received at 410 with a second signal (e.g., second repetition of the control message) received at 415.

At 425, the UE 115-*b*, the base station 105-*b*, or both, may identify that the first control message (e.g., first repetition of the control message) and the second control message (e.g., second repetition of the control message) do not include TCI fields. In this regard, the UE 115-*b* and/or the base station 105-*b* may identify that the one or more repetitions of the control message do not indicate TCI fields for the downlink message scheduled by the repetitions of the control message.

At 430, the UE 115-*b* may receive, from the base station 105-*b*, additional control signaling which indicates one or more TCI states which are to be used for the scheduled downlink message. In this regard, the additional control signaling may explicitly indicate which TCI state(s) is to be used for transmission/reception of the scheduled downlink message. The additional control signaling may include an RRC message, a DCI message, a MAC-CE message, or any combination thereof.

In cases where the UE 115-*b* does not receive an explicit indication of the TCI states which are to be used for the scheduled downlink message via the repetitions of the control message at 410 and 415 and/or the additional control signaling at 430, the UE 115-*b* may be configured to determine which TCI state(s) is to be applied for the scheduled downlink message using one or more TCI configurations. As noted previously herein, each TCI configuration may define a set of rules or parameters which are to be used to identify which TCI state(s) is to be used for a scheduled downlink message. In some cases, the base station 105-*b* may configure the UE 115-*b* (e.g., via RRC signaling, control signaling at 410, additional control signaling at 430) with one or more TCI configurations. the UE 115. Additionally, or alternatively, the UE 115-*b* may be pre-configured (e.g., without explicit signaling from the base station 105-*b*) with one or more TCI configurations.

At 435, the UE 115-*b* may identify one or more TCI states (e.g., one or more QCL assumptions) which are to be used for transmitting/receiving the scheduled downlink message. In particular, the UE 115-*b* may identify/select the one or more TCI states which will be used to receive the downlink message from the first set of TCI states and the second set of TCI states corresponding to the first CORESET and the second CORESET, respectively, which were configured via the control signaling at 405.

The UE 115-*b* may identify the one or more TCI states for receiving the downlink message based on (e.g., in accordance with) the one or more TCI configurations, which may be signaled to and/or pre-configured at the UE 115-*b*. Additionally, the UE115-*b* may identify the one or more TCI states at 435 based on receiving the control signaling at 405, receiving the control messages at 410 and/or 415, performing the soft combining at 420, identifying the absence of TCI fields in the control messages at 425, receiving the control signaling at 430, or any combination thereof. For example, in some cases, the control signaling at 405 and/or the additional control signaling at 430 may indicate a TCI configuration (e.g., set of rules) which is to be used by the UE 115-*b* to identify the TCI states for the scheduled downlink message.

As noted previously herein, the UE 115-*b* may identify/select one or more TCI states for receiving the scheduled downlink message based on whether the downlink message includes a single-TRP PDSCH message (e.g., one TCI state/QCL assumption) or a multi-TRP PDSCH message (e.g., two or more TCI states/QCL assumptions).

In some aspects, the UE 115-*b* may identify the one or more TCI states with the highest or lowest TCI identifiers from the first and second sets of TCI states. In other implementations, the UE 115-*b* may identify a single TCI state for the downlink message based on the TCI state being the only TCI state associated with a respective CORESET. Conversely, in other implementations, the UE 115-*b* may identify two TCI states for the downlink message based the two TCI states being associated with a common CORESET. Moreover, in some cases, the UE 115-*b* may identify a TCI state for the downlink message based on the TCI state being associated with both the first CORESET and the second CORESET.

In other cases, as described previously herein, the UE 115-*b* may first select one of the first CORESET or the second CORESET, and may then identify at least one TCI state for the downlink message based on the selected CORESET. In such cases, the UE 115-*b* may first select a CORESET from the first and second CORESET based on which CORESET has the highest or lowest CORESET identifier, based on which CORESET is associated with the search space set with the highest or lowest search space set identifier, based on which CORESET is associated with one TCI state (e.g., non-SFN CORESET) and/or two TCI states (e.g., SFN CORESET).

Subsequently, upon selecting/identifying the CORESET from the first and second CORESETs, the UE 115-*b* may select/identify at least one TCI state based on the identified CORESET. If the identified CORESET is associated with the same quantity of TCI states with which the downlink message is to be transmitted/received (e.g., one TCI state for single-TRP PDSCH, two TCI states for multi-TRP PDSCH), the TCI state(s) corresponding to the identified CORESET may be selected/identified for the scheduled downlink message.

Comparatively, if the identified CORESET is associated with a single TCI state and the scheduled downlink message includes a multi-TRP PDSCH with multiple TCI states, the UE 115-*b* may identify one or more additional TCI states which are associated with the other CORESET. One or more additional TCI states may be identified/selected from the other CORESET (e.g., non-identified CORESET) based on a highest/lowest TCI state, based on an order of indication in MAC-CE/RRC (e.g., additional control signaling at 430), based on whether pre-compensation is used (e.g., select the anchor or non-anchor TCI state), or any combination thereof.

At 440, the UE 115-*b* may monitor for the downlink message. In particular, the UE 115-*b* may monitor for the downlink message using the one or more TCI states which were identified at 335. For example, in cases where the scheduled downlink message includes a single-TRP PDSCH message, the UE 115-*b* may monitor for the downlink message using the single TCI state (e.g., single QCL assumption) which was identified at 435. By way of another example, in cases where the scheduled downlink message includes a multi-TRP PDSCH message, the UE 115-*b* may monitor for the downlink message using the two or more TCI states (e.g., two or more QCL assumptions) which were identified at 435.

At 445, the UE 115-*b* may receive the scheduled downlink message from the base station 105-*b*. The base station 105-*b* may transmit, and the UE 115-*b* may receive, the downlink message at 445 using the one or more TCI states which were identified at 435. Moreover, the UE 115-*b* may receive the scheduled downlink message based on monitoring for the downlink message at 440.

Techniques described herein may provide for improved scheduling of downlink messages at the UE 115-*b* in the context of PDCCH repetition. In particular, techniques described herein may enable the UE 115-*b* to determine TCI state(s) for scheduled downlink messages in cases where repetitions of a scheduling downlink control message occur in a set of PDCCH candidates linked across two CORESETs which are associated with multiple TCI states (e.g., SFN CORESETs). As such, techniques described herein may improve reliability of control signaling used for scheduling communications at the UE 115-*b*, which may enable more efficient and widespread use of scheduling via SFN CORESETs.

Figure 5:
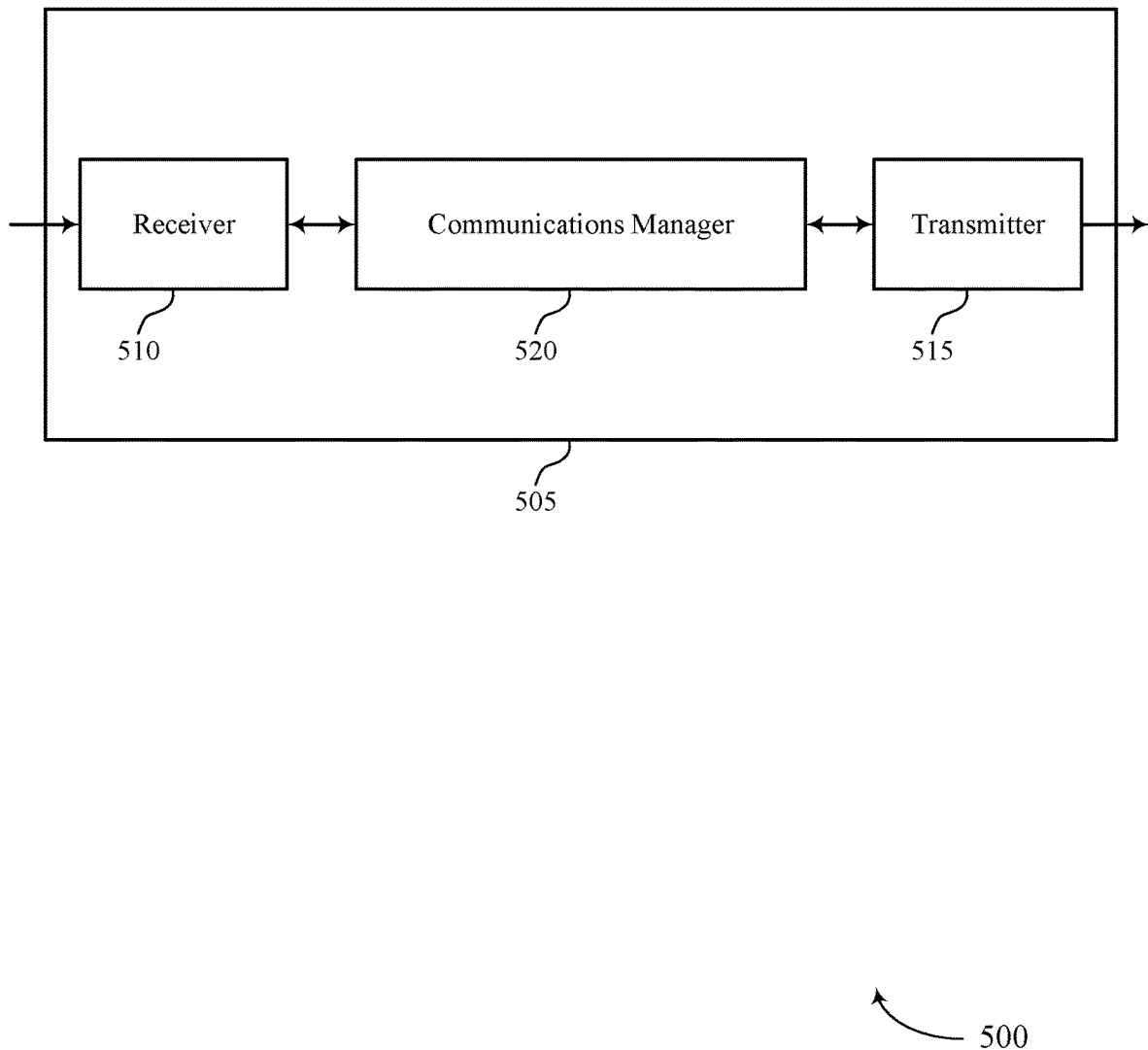
FIGS. 5 and 6 show diagrams of devices that support techniques for TCI states of SFN control channel repetitions in accordance with aspects of the present disclosure.

FIG. 5 shows a diagram 500 of a device 505 that supports techniques for TCI states of SFN control channel repetitions in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for TCI states of SFN control channel repetitions). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for TCI states of SFN control channel repetitions). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for TCI states of SFN control channel repetitions as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for receiving, from a base station, control signaling indicating a first CORESET associated with a first set of TCI states and a second CORESET associated with a second set of TCI states, where a first control channel candidate associated with the first CORESET is linked for control channel repetition to a second control channel candidate associated with the second CORESET, and where the first set of TCI states, the second set of TCI states, or both, includes two or more TCI states. The communications manager 520 may be configured as or otherwise support a means for receiving, from the base station within the first control channel candidate, the second control channel candidate, or both, one or more repetitions of a control message scheduling a downlink message from the base station to the UE. The communications manager 520 may be configured as or otherwise support a means for identifying, in accordance with a TCI configuration, at least one TCI state for the downlink message from the first set of TCI states, the second set of TCI states, or both. The communications manager 520 may be configured as or otherwise support a means for monitoring for the downlink message using the at least one identified TCI state.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for improved scheduling of downlink messages at a UE 115 in the context of PDCCH repetition. In particular, techniques described herein may enable UEs 115 to determine TCI state(s) for scheduled downlink messages in cases where repetitions of a scheduling downlink control message occur in a set of PDCCH candidates linked across two CORESETs which are associated with multiple TCI states (e.g., SFN CORESETs). As such, techniques described herein may improve reliability of control signaling used for scheduling communications at a UE 115, which may enable more efficient and widespread use of scheduling via SFN CORESETs.

Figure 6:
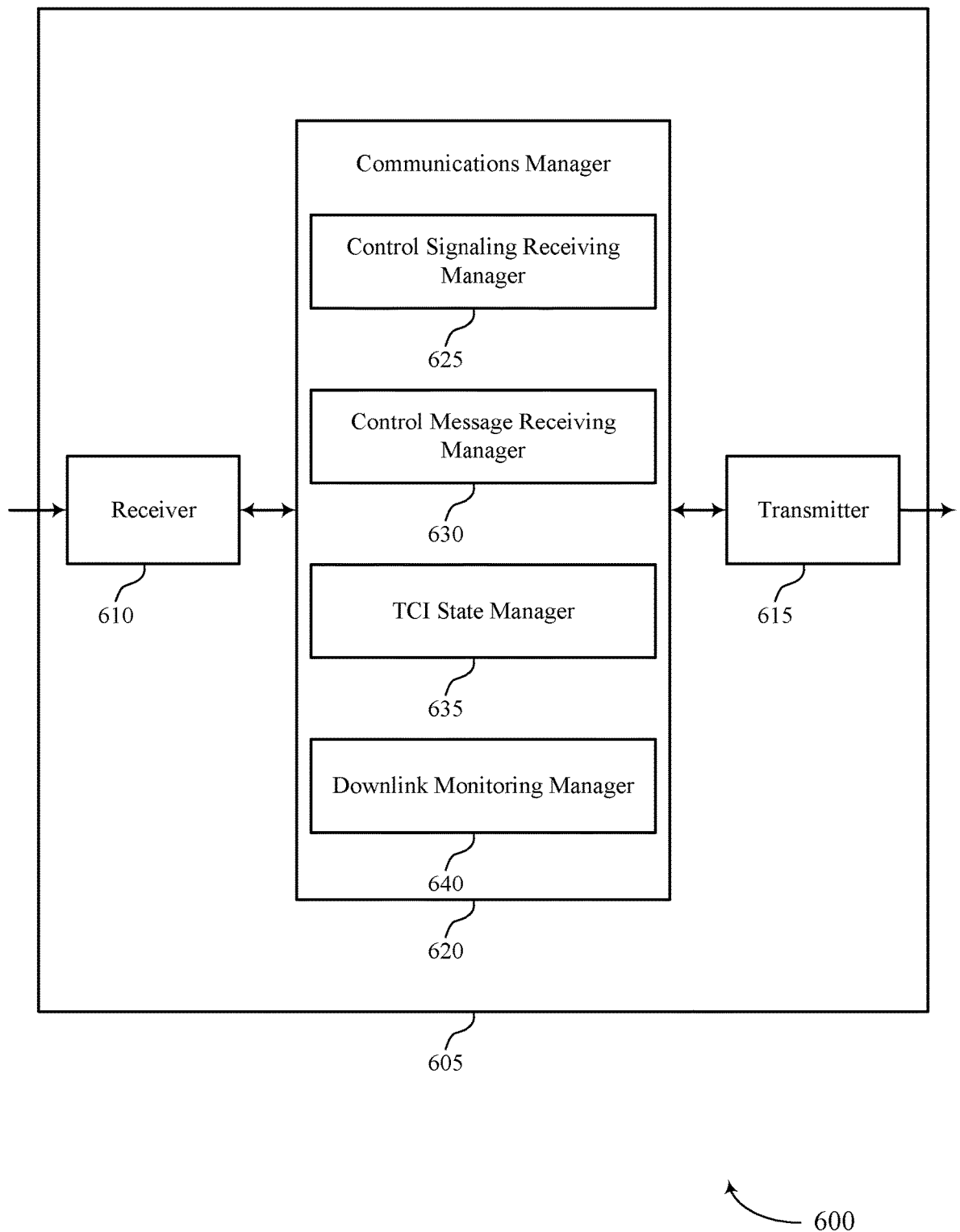

FIG. 6 shows a diagram 600 of a device 605 that supports techniques for TCI states of SFN control channel repetitions in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for TCI states of SFN control channel repetitions). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for TCI states of SFN control channel repetitions). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for TCI states of SFN control channel repetitions as described herein. For example, the communications manager 620 may include a control signaling receiving manager 625, a control message receiving manager 630, a TCI state manager 635, a downlink monitoring manager 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The control signaling receiving manager 625 may be configured as or otherwise support a means for receiving, from a base station, control signaling indicating a first CORESET associated with a first set of TCI states and a second CORESET associated with a second set of TCI states, where a first control channel candidate associated with the first CORESET is linked for control channel repetition to a second control channel candidate associated with the second CORESET, and where the first set of TCI states, the second set of TCI states, or both, includes two or more TCI states. The control message receiving manager 630 may be configured as or otherwise support a means for receiving, from the base station within the first control channel candidate, the second control channel candidate, or both, one or more repetitions of a control message scheduling a downlink message from the base station to the UE. The TCI state manager 635 may be configured as or otherwise support a means for identifying, in accordance with a TCI configuration, at least one TCI state for the downlink message from the first set of TCI states, the second set of TCI states, or both. The downlink monitoring manager 640 may be configured as or otherwise support a means for monitoring for the downlink message using the at least one identified TCI state.

Figure 7:
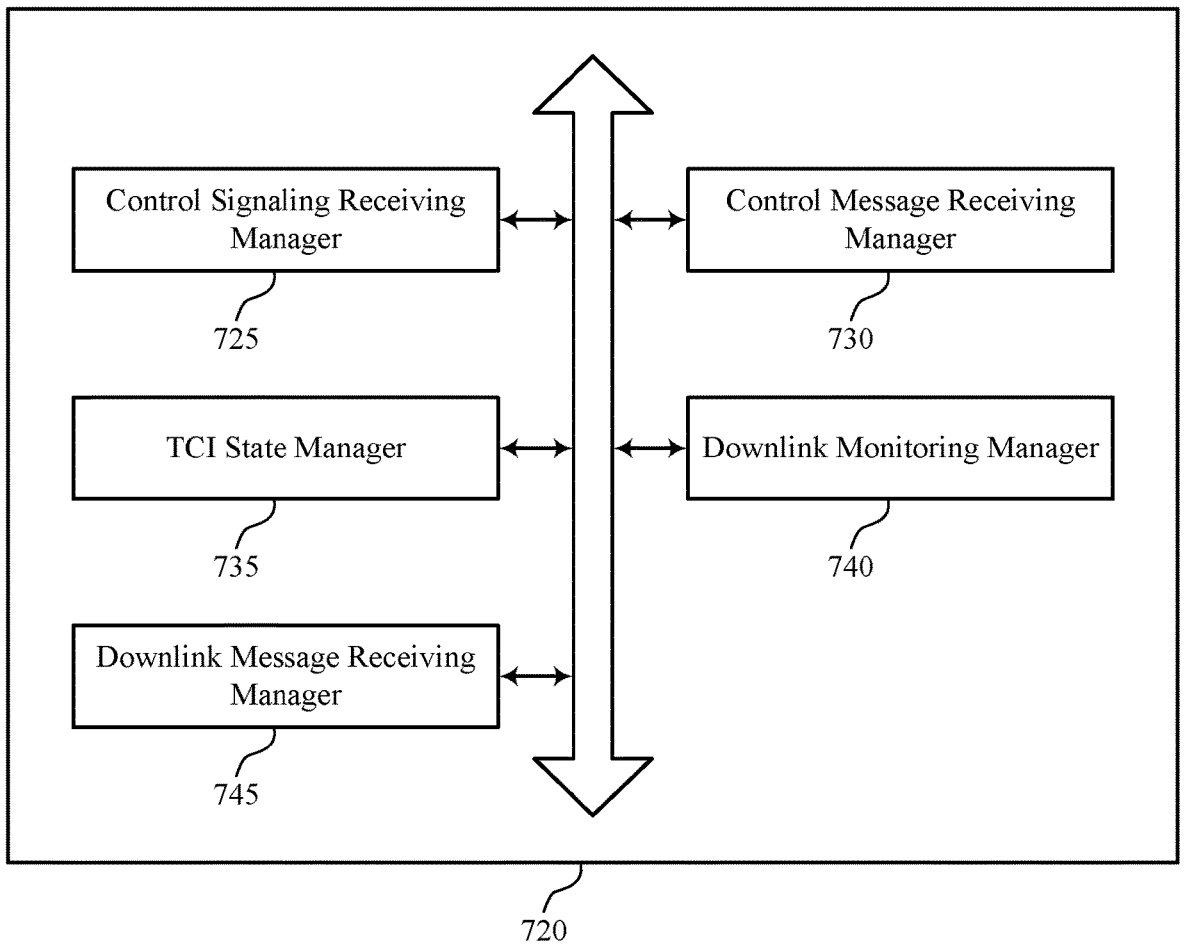
FIG. 7 shows a diagram of a communications manager that supports techniques for TCI states of SFN control channel repetitions in accordance with aspects of the present disclosure.

FIG. 7 shows a diagram 700 of a communications manager 720 that supports techniques for TCI states of SFN control channel repetitions in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for TCI states of SFN control channel repetitions as described herein. For example, the communications manager 720 may include a control signaling receiving manager 725, a control message receiving manager 730, a TCI state manager 735, a downlink monitoring manager 740, a downlink message receiving manager 745, or any combination thereof. Each of these components may communicate, directly or indirectly, with one another (e.g., via one or more buses).

The communications manager 720 may support wireless communication at a UE in accordance with examples as disclosed herein. The control signaling receiving manager 725 may be configured as or otherwise support a means for receiving, from a base station, control signaling indicating a first CORESET associated with a first set of TCI states and a second CORESET associated with a second set of TCI states, where a first control channel candidate associated with the first CORESET is linked for control channel repetition to a second control channel candidate associated with the second CORESET, and where the first set of TCI states, the second set of TCI states, or both, includes two or more TCI states. The control message receiving manager 730 may be configured as or otherwise support a means for receiving, from the base station within the first control channel candidate, the second control channel candidate, or both, one or more repetitions of a control message scheduling a downlink message from the base station to the UE. The TCI state manager 735 may be configured as or otherwise support a means for identifying, in accordance with a TCI configuration, at least one TCI state for the downlink message from the first set of TCI states, the second set of TCI states, or both. The downlink monitoring manager 740 may be configured as or otherwise support a means for monitoring for the downlink message using the at least one identified TCI state.

In some examples, the downlink message receiving manager 745 may be configured as or otherwise support a means for receiving the downlink message in accordance with the identified TCI state and based on the monitoring. In some examples, the control signaling receiving manager 725 may be configured as or otherwise support a means for receiving, via the control signaling, an indication of the TCI configuration, where the identifying is based on the additional control signaling.

In some examples, to support monitoring for the downlink message, the downlink monitoring manager 740 may be configured as or otherwise support a means for monitoring for the downlink message using the at least one TCI state that is associated with a highest TCI state identifier or a lowest TCI state identifier among the first set of TCI states and the second set of TCI states.

In some examples, to support monitoring for the downlink message, the downlink monitoring manager 740 may be configured as or otherwise support a means for monitoring for the downlink message using the at least one TCI state corresponding to one of the first CORESET or the second CORESET. In some examples, to support monitoring for the downlink message, the downlink monitoring manager 740 may be configured as or otherwise support a means for monitoring for the downlink message using the at least one TCI state of the first CORESET or the second CORESET that is associated with a highest CORESET identifier or a lowest CORESET identifier.

In some examples, to support monitoring for the downlink message, the downlink monitoring manager 740 may be configured as or otherwise support a means for monitoring for the downlink message using the at least one TCI state of the first CORESET or the second CORESET that is associated with a highest search space set identifier or a lowest search space set identifier. In some examples, to support monitoring for the downlink message, the downlink monitoring manager 740 may be configured as or otherwise support a means for monitoring for the downlink message using the at least one TCI state which is associated with a CORESET of the first CORESET or the second CORESET which is associated with the single TCI state, where the at least one TCI state includes the single TCI state.

In some examples, to support monitoring for the downlink message, the downlink monitoring manager 740 may be configured as or otherwise support a means for monitoring for the downlink message using a second TCI state from one of the first set of TCI states or the second set of TCI states which includes the two or more TCI states. In some examples, to support monitoring for the downlink message, the downlink monitoring manager 740 may be configured as or otherwise support a means for monitoring for the downlink message using the at least one TCI state which is associated with a CORESET of the first CORESET or the second CORESET which is associated with the two or more TCI states. In some examples, the at least one TCI state includes the two or more TCI states.

In some examples, to support monitoring for the downlink message, the downlink monitoring manager 740 may be configured as or otherwise support a means for monitoring for the downlink message using the at least one TCI state that is associated with a highest TCI state identifier or a lowest TCI state identifier among the two or more TCI states.

In some examples, the control signaling receiving manager 725 may be configured as or otherwise support a means for receiving, from the base station, additional control signaling including an indication of a TCI state of the two or more TCI states, where identifying the at least one TCI state is based on the additional control signaling.

In some examples, to support monitoring for the control message, the downlink monitoring manager 740 may be configured as or otherwise support a means for monitoring for the control message using the at least one TCI state which includes an anchor TCI state or a non-anchor TCI state. In some examples, to support monitoring for the downlink message, the downlink monitoring manager 740 may be configured as or otherwise support a means for monitoring for the downlink message using the at least one TCI state based on the at least one TCI state being included within the first set of TCI states and the second set of TCI states.

In some examples, the TCI state manager 735 may be configured as or otherwise support a means for identifying a set of mappings between a set of TCI codepoints and a set of TCI states configured at the UE, where identifying the at least one TCI state is based on the set of mappings.

In some examples, at least one mapping of the set of mappings includes a mapping between a TCI codepoint of the set of TCI codepoints and two TCI states of the set of TCI states. In some examples, identifying the at least one TCI state is based on the at least one mapping. In some examples, the first CORESET, the second CORESET, or both, are associated with a SFN.

In some examples, the control message receiving manager 730 may be configured as or otherwise support a means for identifying that the one or more repetitions of the control message do not include a TCI field, where identifying the at least one TCI state is based on identifying that the one or more repetitions of the control message do not include the TCI field.

In some examples, to support monitoring for the downlink message, the downlink monitoring manager 740 may be configured as or otherwise support a means for monitoring for the downlink message using the at least one identified TCI state based on a time interval between reception of the one or more repetitions of the control message and reception of the downlink message being greater than or equal to a threshold time interval, and based on the first set of TCI states, the second set of TCI states, or both, being associated with the QCL TypeD.

Figure 8:
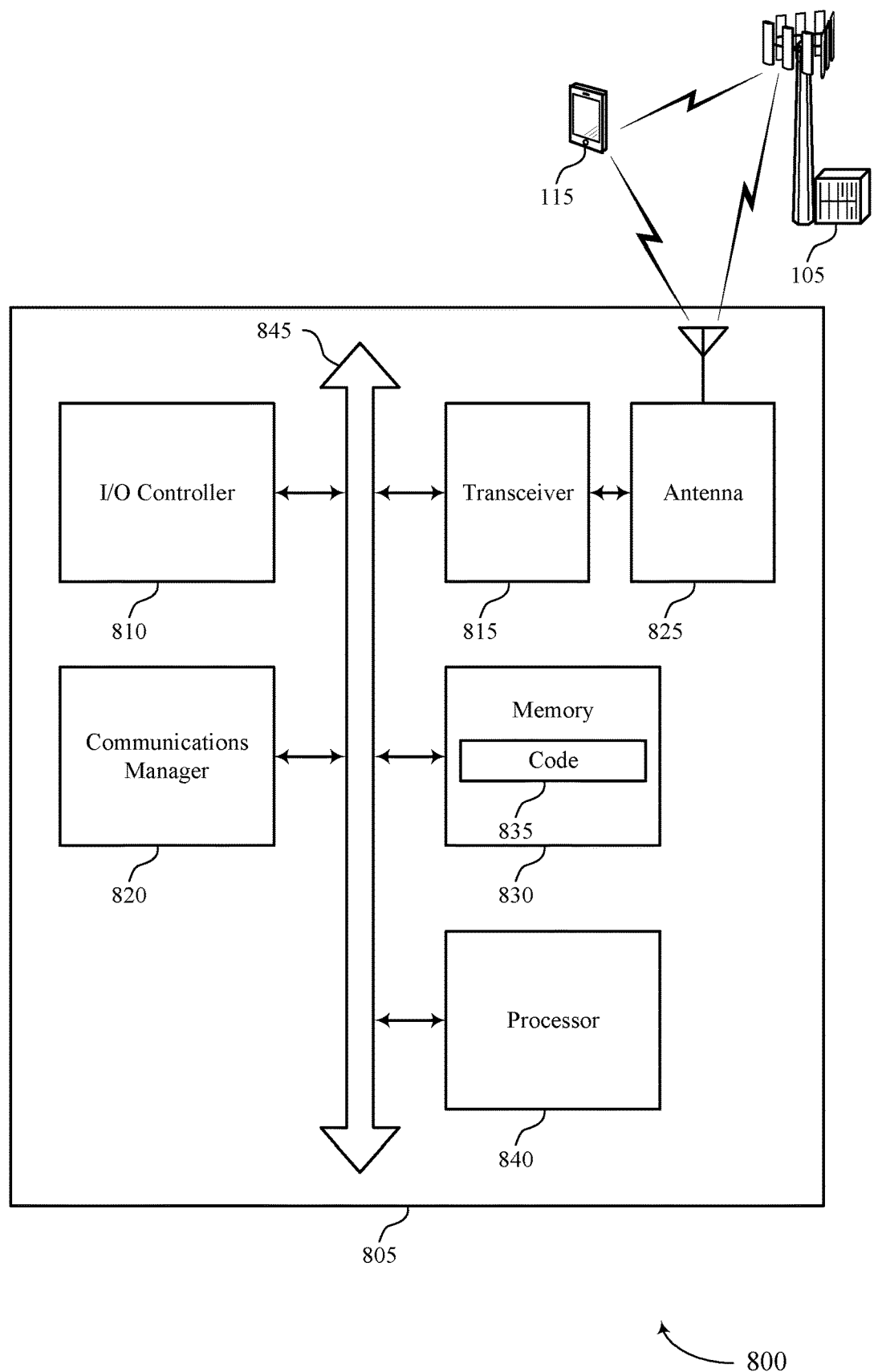
FIG. 8 shows a diagram of a system including a device that supports techniques for TCI states of SFN control channel repetitions in accordance with aspects of the present disclosure.

FIG. 8 shows a diagram of a system 800 including a device 805 that supports techniques for TCI states of SFN control channel repetitions in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for TCI states of SFN control channel repetitions). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving, from a base station, control signaling indicating a first CORESET associated with a first set of TCI states and a second CORESET associated with a second set of TCI states, where a first control channel candidate associated with the first CORESET is linked for control channel repetition to a second control channel candidate associated with the second CORESET, and where the first set of TCI states, the second set of TCI states, or both, includes two or more TCI states. The communications manager 820 may be configured as or otherwise support a means for receiving, from the base station within the first control channel candidate, the second control channel candidate, or both, one or more repetitions of a control message scheduling a downlink message from the base station to the UE. The communications manager 820 may be configured as or otherwise support a means for identifying, in accordance with a TCI configuration, at least one TCI state for the downlink message from the first set of TCI states, the second set of TCI states, or both. The communications manager 820 may be configured as or otherwise support a means for monitoring for the downlink message using the at least one identified TCI state.

By including or configuring the communications manager 820 in accordance with examples as described herein, the device 805 may support techniques for improved scheduling of downlink messages at a UE 115 in the context of PDCCH repetition. In particular, techniques described herein may enable UEs 115 to determine TCI state(s) for scheduled downlink messages in cases where repetitions of a scheduling downlink control message occur in a set of PDCCH candidates linked across two CORESETs which are associated with multiple TCI states (e.g., SFN CORESETs). As such, techniques described herein may improve reliability of control signaling used for scheduling communications at a UE 115, which may enable more efficient and widespread use of scheduling via SFN CORESETs.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for TCI states of SFN control channel repetitions as described herein, or the processor 840 and the memory 830 may be otherwise configured to perform or support such operations.

Figure 9:
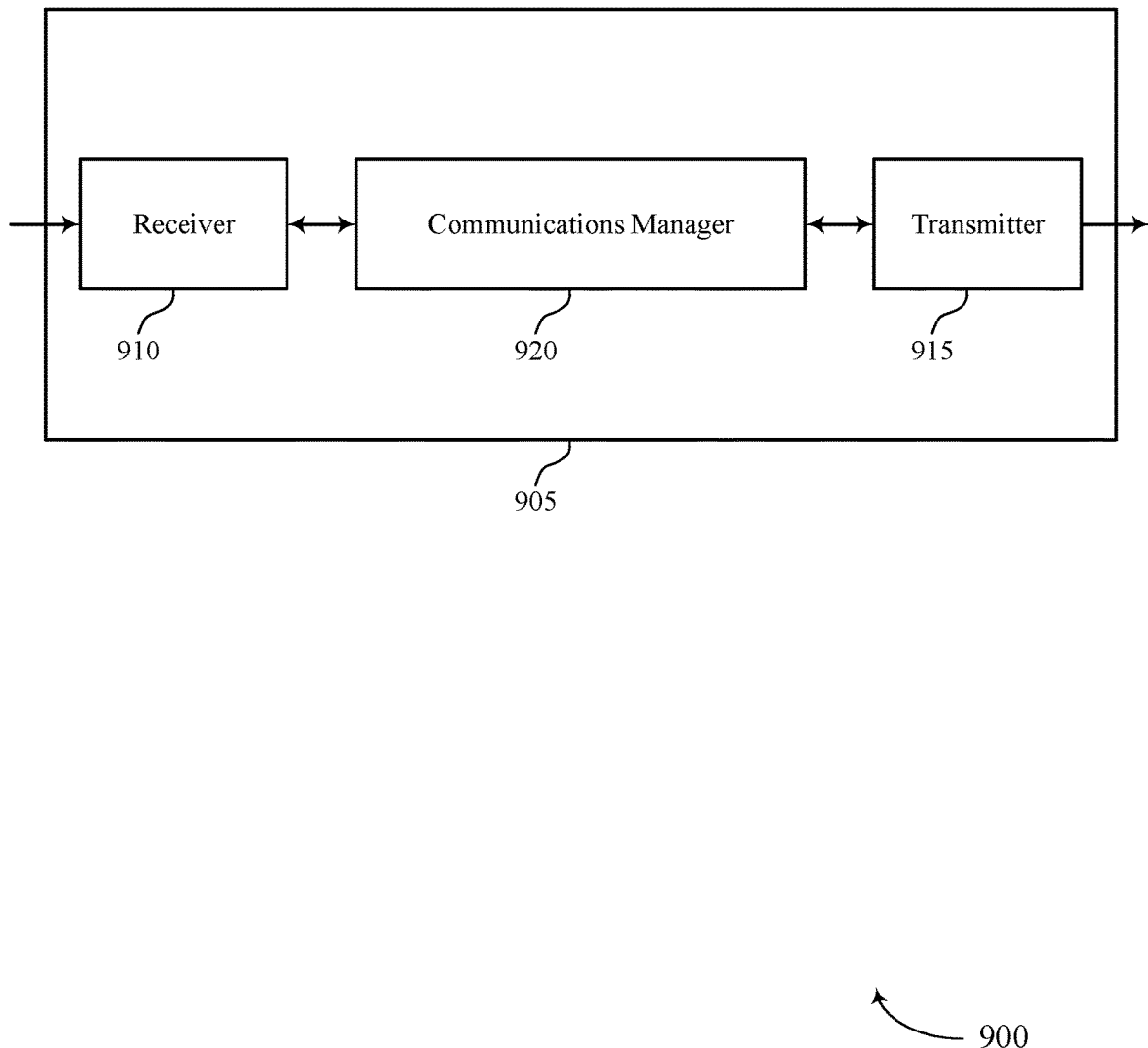
FIGS. 9 and 10 show diagrams of devices that support techniques for TCI states of SFN control channel repetitions in accordance with aspects of the present disclosure.

FIG. 9 shows a diagram 900 of a device 905 that supports techniques for TCI states of SFN control channel repetitions in accordance with aspects of the present disclosure. The device 905 may be an example of aspects of a base station 105 (or network device 105) as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for TCI states of SFN control channel repetitions). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for TCI states of SFN control channel repetitions). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for TCI states of SFN control channel repetitions as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for transmitting, to a UE, control signaling indicating a first CORESET associated with a first set of TCI states and a second CORESET associated with a second set of TCI states, where a first control channel candidate associated with the first CORESET is linked for control channel repetition to a second control channel candidate associated with the second CORESET, and where the first set of TCI states, the second set of TCI states, or both, includes two or more TCI states. The communications manager 920 may be configured as or otherwise support a means for transmitting, to the UE within the first control channel candidate, the second control channel candidate, or both, one or more repetitions of a control message scheduling a downlink message from the base station to the UE. The communications manager 920 may be configured as or otherwise support a means for identifying, in accordance with a TCI configuration, at least one TCI state for the downlink message from the first set of TCI states, the second set of TCI states, or both. The communications manager 920 may be configured as or otherwise support a means for transmitting the downlink message using the at least one identified TCI state.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for improved scheduling of downlink messages at a UE 115 in the context of PDCCH repetition. In particular, techniques described herein may enable UEs 115 to determine TCI state(s) for scheduled downlink messages in cases where repetitions of a scheduling downlink control message occur in a set of PDCCH candidates linked across two CORESETs which are associated with multiple TCI states (e.g., SFN CORESETs). As such, techniques described herein may improve reliability of control signaling used for scheduling communications at a UE 115, which may enable more efficient and widespread use of scheduling via SFN CORESETs.

Figure 10:
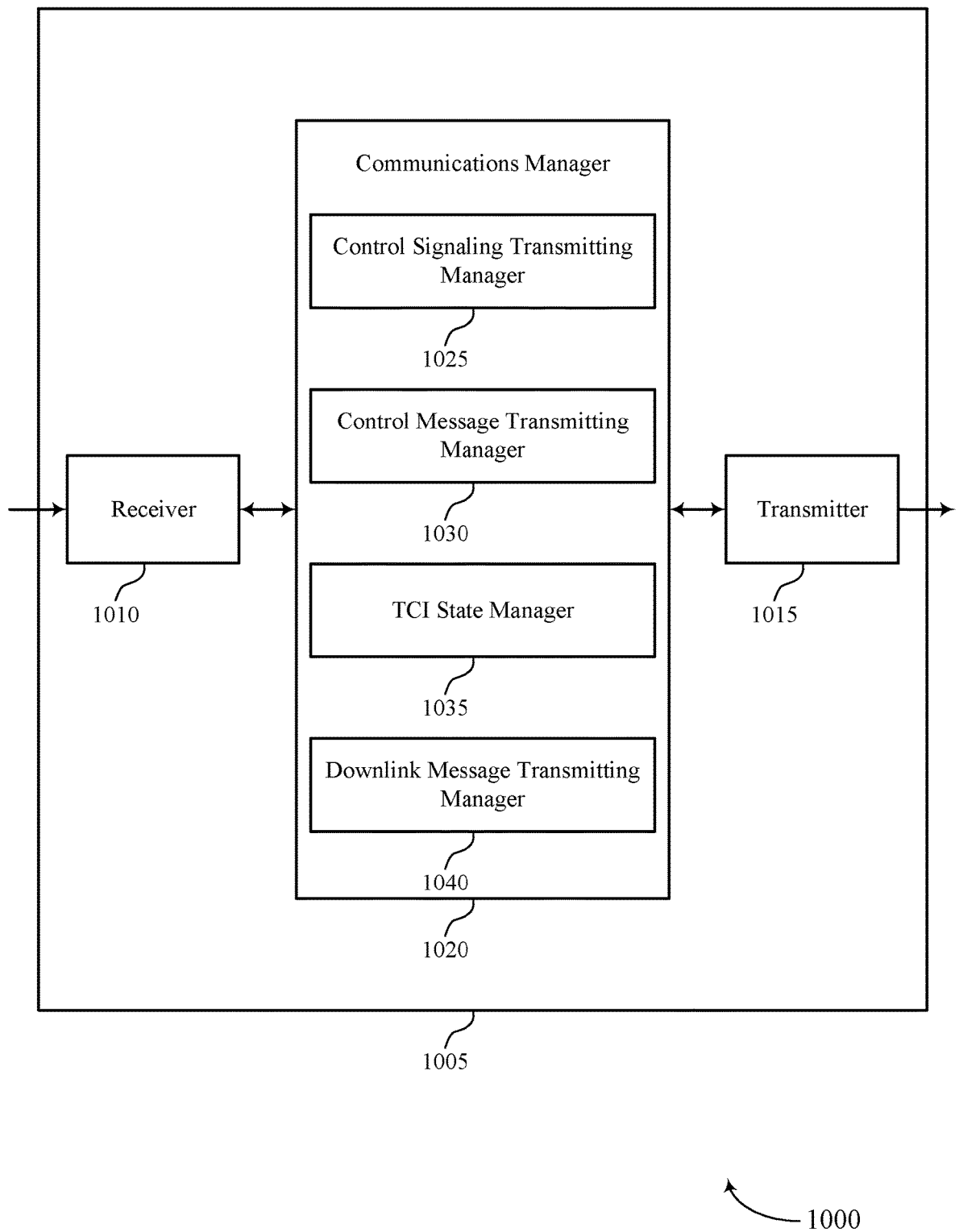

FIG. 10 shows a diagram 1000 of a device 1005 that supports techniques for TCI states of SFN control channel repetitions in accordance with aspects of the present disclosure. The device 1005 may be an example of aspects of a device 905 or a base station 105 (or network device 105) as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for TCI states of SFN control channel repetitions). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for TCI states of SFN control channel repetitions). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for TCI states of SFN control channel repetitions as described herein. For example, the communications manager 1020 may include a control signaling transmitting manager 1025, a control message transmitting manager 1030, a TCI state manager 1035, a downlink message transmitting manager 1040, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The control signaling transmitting manager 1025 may be configured as or otherwise support a means for transmitting, to a UE, control signaling indicating a first CORESET associated with a first set of TCI states and a second CORESET associated with a second set of TCI states, where a first control channel candidate associated with the first CORESET is linked for control channel repetition to a second control channel candidate associated with the second CORESET, and where the first set of TCI states, the second set of TCI states, or both, includes two or more TCI states. The control message transmitting manager 1030 may be configured as or otherwise support a means for transmitting, to the UE within the first control channel candidate, the second control channel candidate, or both, one or more repetitions of a control message scheduling a downlink message from the base station to the UE. The TCI state manager 1035 may be configured as or otherwise support a means for identifying, in accordance with a TCI configuration, at least one TCI state for the downlink message from the first set of TCI states, the second set of TCI states, or both. The downlink message transmitting manager 1040 may be configured as or otherwise support a means for transmitting the downlink message using the at least one identified TCI state.

Figure 11:
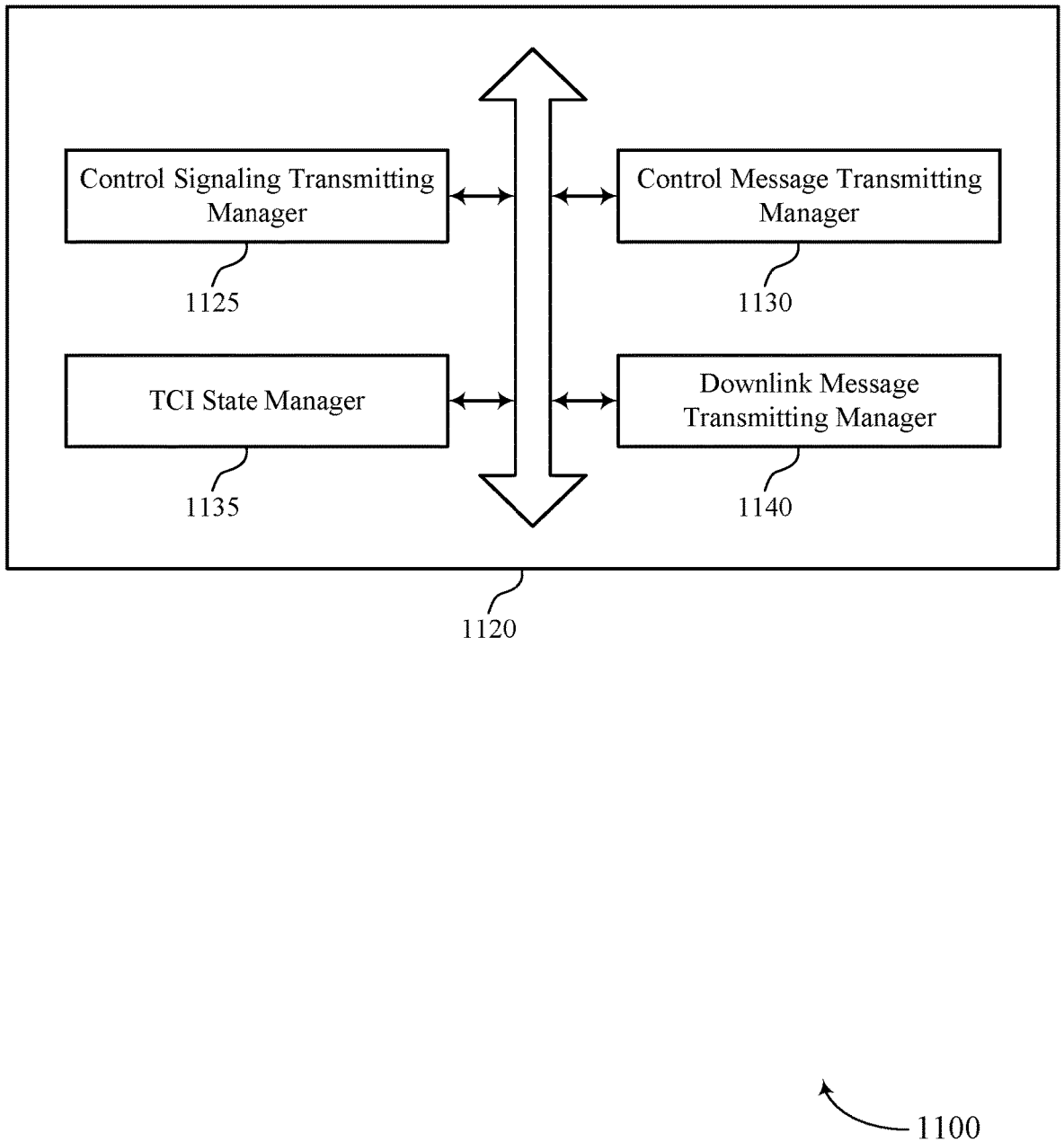
FIG. 11 shows a diagram of a communications manager that supports techniques for TCI states of SFN control channel repetitions in accordance with aspects of the present disclosure.

FIG. 11 shows a diagram 1100 of a communications manager 1120 that supports techniques for TCI states of SFN control channel repetitions in accordance with aspects of the present disclosure. The communications manager 1120 may be an example of aspects of a communications manager 920, a communications manager 1020, or both, as described herein. The communications manager 1120, or various components thereof, may be an example of means for performing various aspects of techniques for TCI states of SFN control channel repetitions as described herein. For example, the communications manager 1120 may include a control signaling transmitting manager 1125, a control message transmitting manager 1130, a TCI state manager 1135, a downlink message transmitting manager 1140, or any combination thereof. Each of these components may communicate, directly or indirectly, with one another (e.g., via one or more buses).

The communications manager 1120 may support wireless communication at a base station in accordance with examples as disclosed herein. The control signaling transmitting manager 1125 may be configured as or otherwise support a means for transmitting, to a UE, control signaling indicating a first CORESET associated with a first set of TCI states and a second CORESET associated with a second set of TCI states, where a first control channel candidate associated with the first CORESET is linked for control channel repetition to a second control channel candidate associated with the second CORESET, and where the first set of TCI states, the second set of TCI states, or both, includes two or more TCI states. The control message transmitting manager 1130 may be configured as or otherwise support a means for transmitting, to the UE within the first control channel candidate, the second control channel candidate, or both, one or more repetitions of a control message scheduling a downlink message from the base station to the UE. The TCI state manager 1135 may be configured as or otherwise support a means for identifying, in accordance with a TCI configuration, at least one TCI state for the downlink message from the first set of TCI states, the second set of TCI states, or both. The downlink message transmitting manager 1140 may be configured as or otherwise support a means for transmitting the downlink message using the at least one identified TCI state.

In some examples, the control signaling transmitting manager 1125 may be configured as or otherwise support a means for transmitting, via the control signaling, an indication of the TCI configuration, where the identifying is based on the control signaling.

In some examples, to support transmitting the downlink message, the downlink message transmitting manager 1140 may be configured as or otherwise support a means for transmitting the downlink message using the at least one TCI state that is associated with a highest TCI state identifier or a lowest TCI state identifier among the first set of TCI states and the second set of TCI states. In some examples, to support transmitting the downlink message, the downlink message transmitting manager 1140 may be configured as or otherwise support a means for transmitting the downlink message using the at least one TCI state corresponding to one of the first CORESET or the second CORESET.

In some examples, to support transmitting the downlink message, the downlink message transmitting manager 1140 may be configured as or otherwise support a means for transmitting the downlink message using the at least one TCI state of the first CORESET or the second CORESET that is associated with a highest CORESET identifier or a lowest CORESET identifier. In some examples, to support transmitting the downlink message, the downlink message transmitting manager 1140 may be configured as or otherwise support a means for transmitting the downlink message using the at least one TCI state of the first CORESET or the second CORESET that is associated with a highest search space set identifier or a lowest search space set identifier.

In some examples, to support transmitting the downlink message, the downlink message transmitting manager 1140 may be configured as or otherwise support a means for transmitting the downlink message using the at least one TCI state which is associated with a CORESET of the first CORESET or the second CORESET which is associated with the single TCI state, where the at least one TCI state includes the single TCI state. In some examples, to support transmitting the downlink message, the downlink message transmitting manager 1140 may be configured as or otherwise support a means for transmitting the downlink message using a second TCI state from one of the first set of TCI states or the second set of TCI states which includes the two or more TCI states.

In some examples, to support transmitting the downlink message, the downlink message transmitting manager 1140 may be configured as or otherwise support a means for transmitting the downlink message using the at least one TCI state which is associated with a CORESET of the first CORESET or the second CORESET which is associated with the two or more TCI states. In some examples, the at least one TCI state includes the two or more TCI states.

In some examples, to support transmitting the downlink message, the downlink message transmitting manager 1140 may be configured as or otherwise support a means for transmitting the downlink message using the at least one TCI state that is associated with a highest TCI state identifier or a lowest TCI state identifier among the two or more TCI states.

In some examples, the control signaling transmitting manager 1125 may be configured as or otherwise support a means for transmitting, to the UE, additional control signaling including an indication of a TCI state of the two or more TCI states, where identifying the at least one TCI state is based on the additional control signaling.

In some examples, to support transmitting the control message, the control message transmitting manager 1130 may be configured as or otherwise support a means for transmitting the control message using the at least one TCI state which includes an anchor TCI state or a non-anchor TCI state.

In some examples, to support transmitting the downlink message, the downlink message transmitting manager 1140 may be configured as or otherwise support a means for transmitting the downlink message using the at least one TCI state based on the at least one TCI state being included within the first set of TCI states and the second set of TCI states.

In some examples, the TCI state manager 1135 may be configured as or otherwise support a means for identifying a set of mappings between a set of TCI codepoints and a set of TCI states configured at the UE, where identifying the at least one TCI state is based on the set of mappings.

In some examples, at least one mapping of the set of mappings includes a mapping between a TCI codepoint of the set of TCI codepoints and two TCI states of the set of TCI states. In some examples, identifying the at least one TCI state is based on the at least one mapping. In some examples, the first CORESET, the second CORESET, or both, are associated with a SFN.

In some examples, the TCI state manager 1135 may be configured as or otherwise support a means for identifying that the one or more repetitions of the control message do not include a TCI field, where identifying the at least one TCI state is based on identifying that the one or more repetitions of the control message do not include the TCI field.

Figure 12:
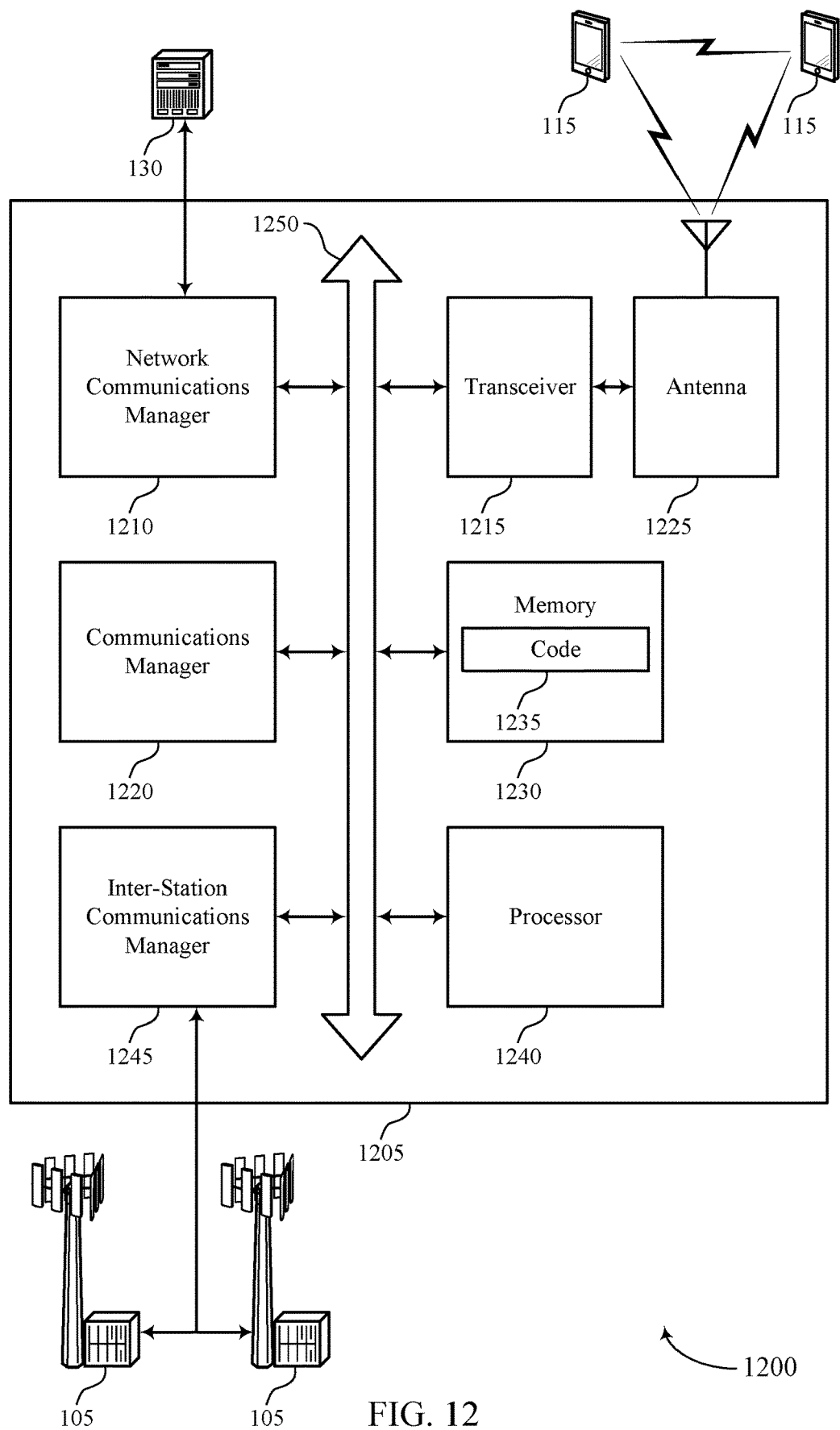
FIG. 12 shows a diagram of a system including a device that supports techniques for TCI states of SFN control channel repetitions in accordance with aspects of the present disclosure.

FIG. 12 shows a diagram of a system 1200 including a device 1205 that supports techniques for TCI states of SFN control channel repetitions in accordance with aspects of the present disclosure. The device 1205 may be an example of or include the components of a device 905, a device 1005, or a base station 105 (or network device 105) as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for TCI states of SFN control channel repetitions). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for transmitting, to a UE, control signaling indicating a first CORESET associated with a first set of TCI states and a second CORESET associated with a second set of TCI states, where a first control channel candidate associated with the first CORESET is linked for control channel repetition to a second control channel candidate associated with the second CORESET, and where the first set of TCI states, the second set of TCI states, or both, includes two or more TCI states. The communications manager 1220 may be configured as or otherwise support a means for transmitting, to the UE within the first control channel candidate, the second control channel candidate, or both, one or more repetitions of a control message scheduling a downlink message from the base station to the UE. The communications manager 1220 may be configured as or otherwise support a means for identifying, in accordance with a TCI configuration, at least one TCI state for the downlink message from the first set of TCI states, the second set of TCI states, or both. The communications manager 1220 may be configured as or otherwise support a means for transmitting the downlink message using the at least one identified TCI state.

By including or configuring the communications manager 1220 in accordance with examples as described herein, the device 1205 may support techniques for improved scheduling of downlink messages at a UE 115 in the context of PDCCH repetition. In particular, techniques described herein may enable UEs 115 to determine TCI state(s) for scheduled downlink messages in cases where repetitions of a scheduling downlink control message occur in a set of PDCCH candidates linked across two CORESETs which are associated with multiple TCI states (e.g., SFN CORESETs). As such, techniques described herein may improve reliability of control signaling used for scheduling communications at a UE 115, which may enable more efficient and widespread use of scheduling via SFN CORESETs.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for TCI states of SFN control channel repetitions as described herein, or the processor 1240 and the memory 1230 may be otherwise configured to perform or support such operations.

Figure 13:
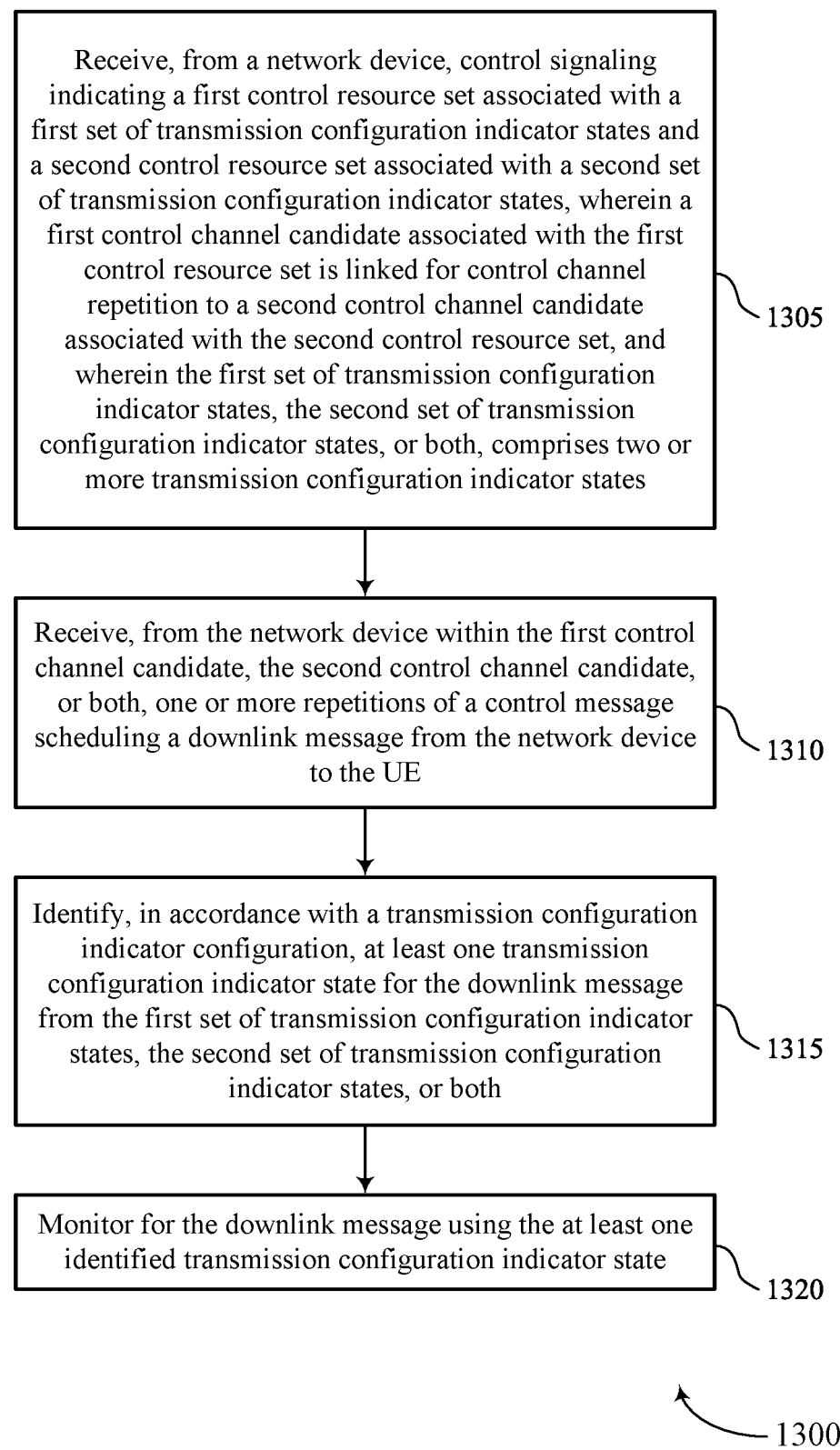
FIGS. 13 through 17 show flowcharts illustrating methods that support techniques for TCI states of SFN control channel repetitions in accordance with aspects of the present disclosure.

FIG. 13 shows a flowchart illustrating a method 1300 that supports techniques for TCI states of SFN control channel repetitions in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, control signaling indicating a first CORESET associated with a first set of TCI states and a second CORESET associated with a second set of TCI states, where a first control channel candidate associated with the first CORESET is linked for control channel repetition to a second control channel candidate associated with the second CORESET, and where the first set of TCI states, the second set of TCI states, or both, includes two or more TCI states. The operations of 1305 may be performed in accordance with examples as disclosed herein. In some examples, aspects of the operations of 1305 may be performed by a control signaling receiving manager 725 as described with reference to FIG. 7.

At 1310, the method may include receiving, from the base station within the first control channel candidate, the second control channel candidate, or both, one or more repetitions of a control message scheduling a downlink message from the base station to the UE. The operations of 1310 may be performed in accordance with examples as disclosed herein. In some examples, aspects of the operations of 1310 may be performed by a control message receiving manager 730 as described with reference to FIG. 7.

At 1315, the method may include identifying, in accordance with a TCI configuration, at least one TCI state for the downlink message from the first set of TCI states, the second set of TCI states, or both. The operations of 1315 may be performed in accordance with examples as disclosed herein. In some examples, aspects of the operations of 1315 may be performed by a TCI state manager 735 as described with reference to FIG. 7.

At 1320, the method may include monitoring for the downlink message using the at least one identified TCI state. The operations of 1320 may be performed in accordance with examples as disclosed herein. In some examples, aspects of the operations of 1320 may be performed by a downlink monitoring manager 740 as described with reference to FIG. 7.

Figure 14:
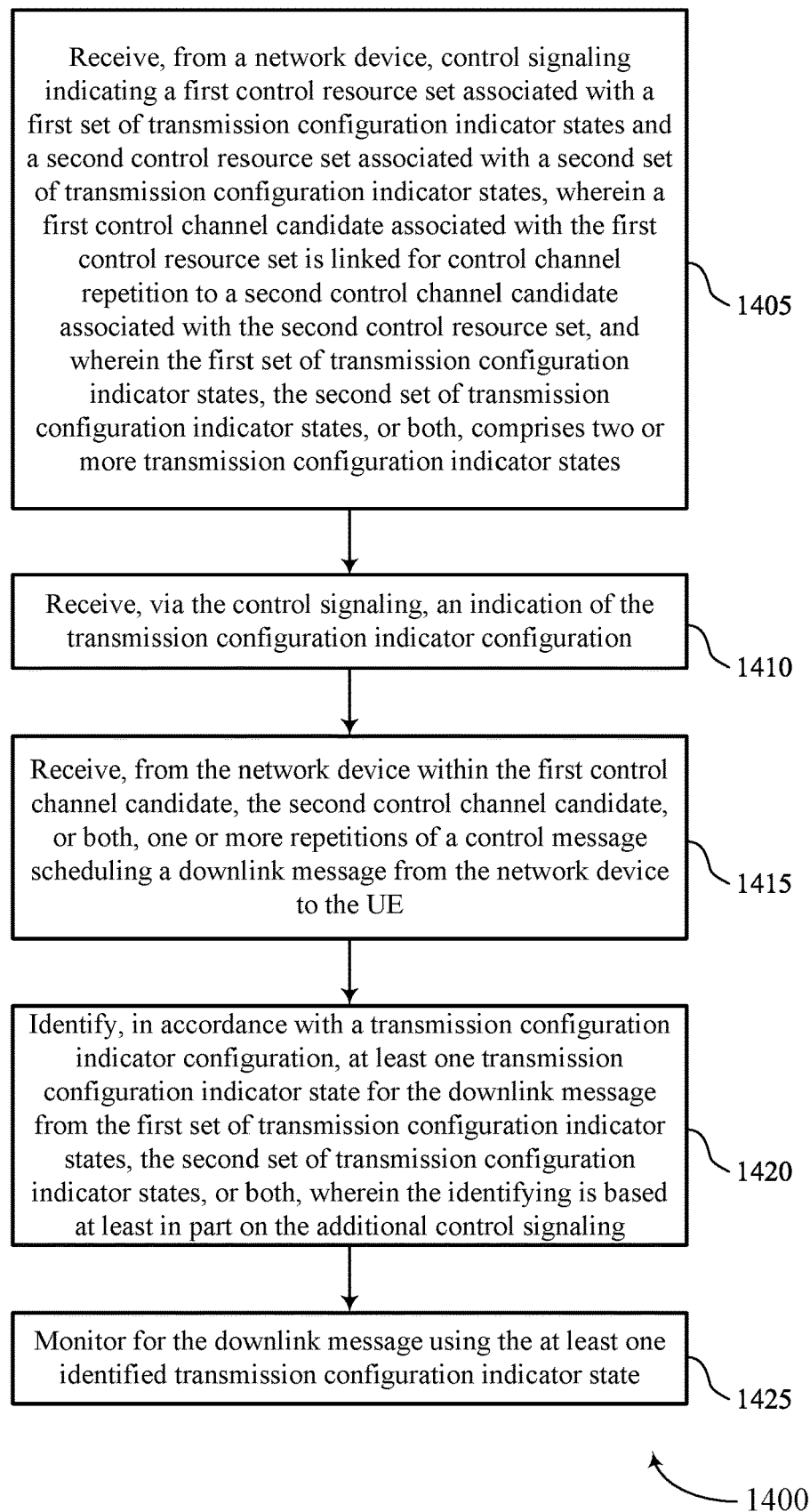

FIG. 14 shows a flowchart illustrating a method 1400 that supports techniques for TCI states of SFN control channel repetitions in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, control signaling indicating a first CORESET associated with a first set of TCI states and a second CORESET associated with a second set of TCI states, where a first control channel candidate associated with the first CORESET is linked for control channel repetition to a second control channel candidate associated with the second CORESET, and where the first set of TCI states, the second set of TCI states, or both, includes two or more TCI states. The operations of 1405 may be performed in accordance with examples as disclosed herein. In some examples, aspects of the operations of 1405 may be performed by a control signaling receiving manager 725 as described with reference to FIG. 7.

At 1410, the method may include receiving, via the control signaling, an indication of the TCI configuration. The operations of 1410 may be performed in accordance with examples as disclosed herein. In some examples, aspects of the operations of 1410 may be performed by a control signaling receiving manager 725 as described with reference to FIG. 7.

At 1415, the method may include receiving, from the base station within the first control channel candidate, the second control channel candidate, or both, one or more repetitions of a control message scheduling a downlink message from the base station to the UE. The operations of 1415 may be performed in accordance with examples as disclosed herein. In some examples, aspects of the operations of 1415 may be performed by a control message receiving manager 730 as described with reference to FIG. 7.

At 1420, the method may include identifying, in accordance with a TCI configuration, at least one TCI state for the downlink message from the first set of TCI states, the second set of TCI states, or both, where the identifying is based on the additional control signaling. The operations of 1420 may be performed in accordance with examples as disclosed herein. In some examples, aspects of the operations of 1420 may be performed by a TCI state manager 735 as described with reference to FIG. 7.

At 1425, the method may include monitoring for the downlink message using the at least one identified TCI state. The operations of 1425 may be performed in accordance with examples as disclosed herein. In some examples, aspects of the operations of 1425 may be performed by a downlink monitoring manager 740 as described with reference to FIG. 7.

Figure 15:
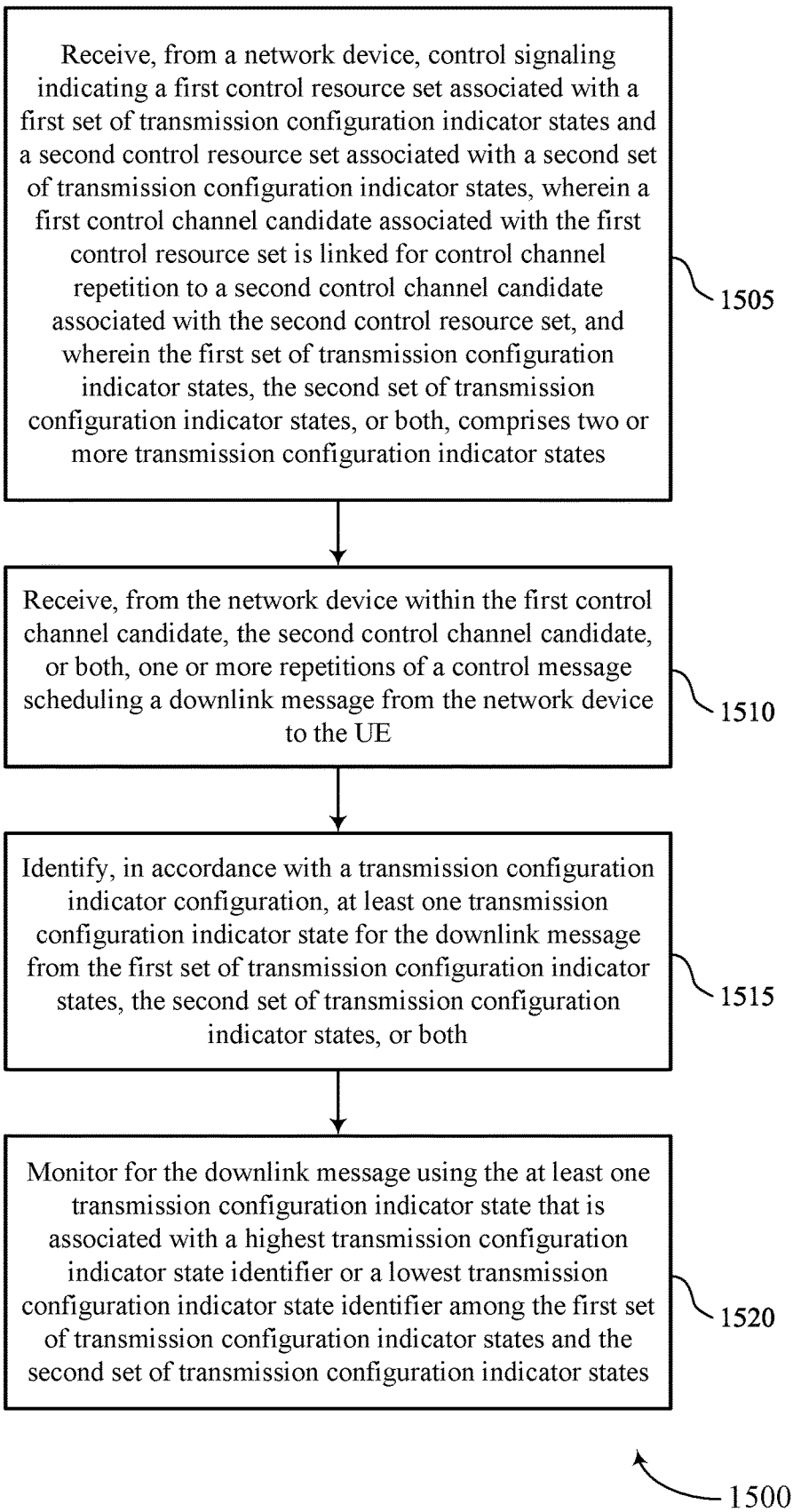

FIG. 15 shows a flowchart illustrating a method 1500 that supports techniques for TCI states of SFN control channel repetitions in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, control signaling indicating a first CORESET associated with a first set of TCI states and a second CORESET associated with a second set of TCI states, where a first control channel candidate associated with the first CORESET is linked for control channel repetition to a second control channel candidate associated with the second CORESET, and where the first set of TCI states, the second set of TCI states, or both, includes two or more TCI states. The operations of 1505 may be performed in accordance with examples as disclosed herein. In some examples, aspects of the operations of 1505 may be performed by a control signaling receiving manager 725 as described with reference to FIG. 7.

At 1510, the method may include receiving, from the base station within the first control channel candidate, the second control channel candidate, or both, one or more repetitions of a control message scheduling a downlink message from the base station to the UE. The operations of 1510 may be performed in accordance with examples as disclosed herein. In some examples, aspects of the operations of 1510 may be performed by a control message receiving manager 730 as described with reference to FIG. 7.

At 1515, the method may include identifying, in accordance with a TCI configuration, at least one TCI state for the downlink message from the first set of TCI states, the second set of TCI states, or both. The operations of 1515 may be performed in accordance with examples as disclosed herein. In some examples, aspects of the operations of 1515 may be performed by a TCI state manager 735 as described with reference to FIG. 7.

At 1520, the method may include monitoring for the downlink message using the at least one TCI state that is associated with a highest TCI state identifier or a lowest TCI state identifier among the first set of TCI states and the second set of TCI states. The operations of 1520 may be performed in accordance with examples as disclosed herein. In some examples, aspects of the operations of 1520 may be performed by a downlink monitoring manager 740 as described with reference to FIG. 7.

Figure 16:
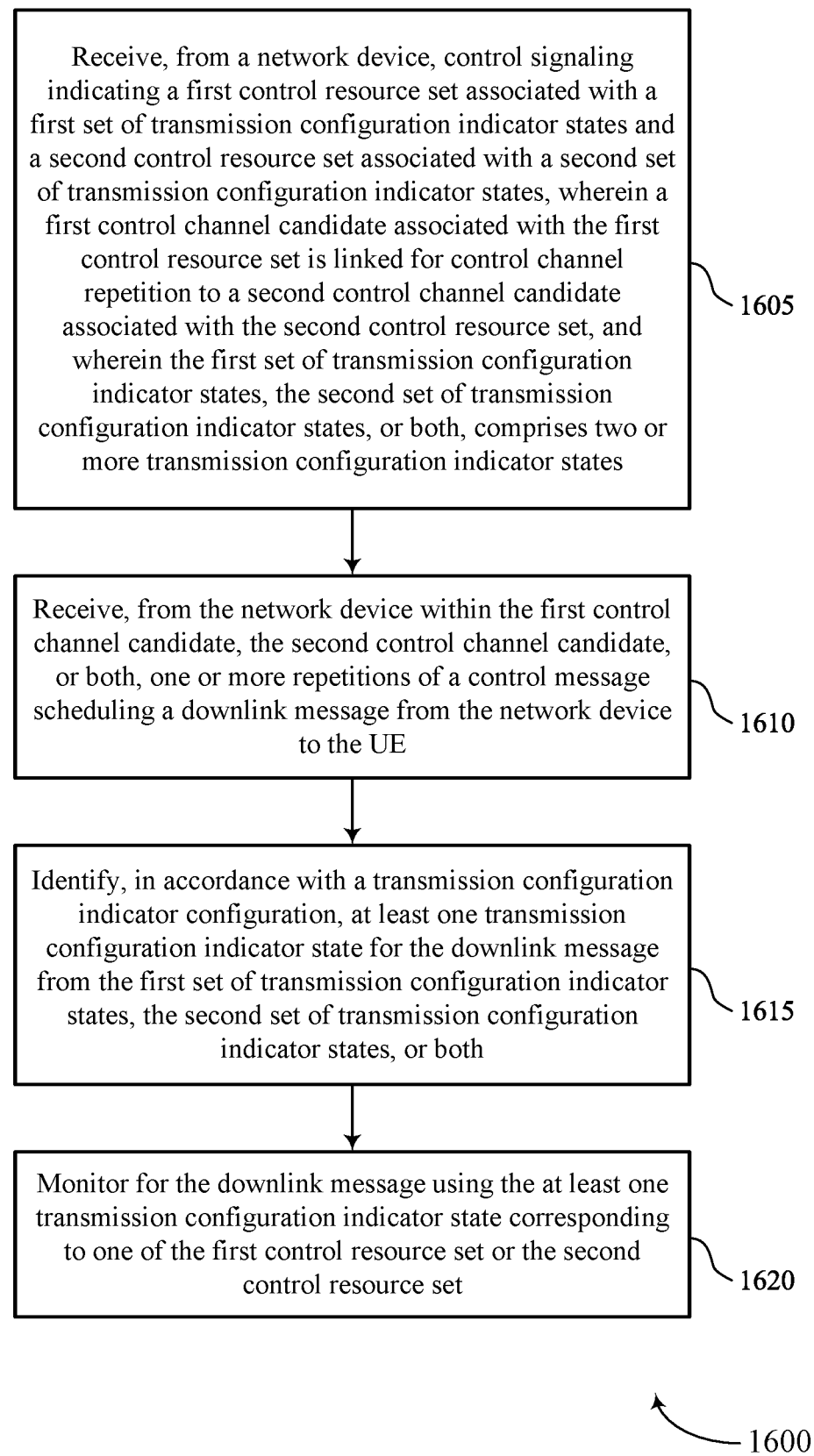

FIG. 16 shows a flowchart illustrating a method 1600 that supports techniques for TCI states of SFN control channel repetitions in accordance with aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, control signaling indicating a first CORESET associated with a first set of TCI states and a second CORESET associated with a second set of TCI states, where a first control channel candidate associated with the first CORESET is linked for control channel repetition to a second control channel candidate associated with the second CORESET, and where the first set of TCI states, the second set of TCI states, or both, includes two or more TCI states. The operations of 1605 may be performed in accordance with examples as disclosed herein. In some examples, aspects of the operations of 1605 may be performed by a control signaling receiving manager 725 as described with reference to FIG. 7.

At 1610, the method may include receiving, from the base station within the first control channel candidate, the second control channel candidate, or both, one or more repetitions of a control message scheduling a downlink message from the base station to the UE. The operations of 1610 may be performed in accordance with examples as disclosed herein. In some examples, aspects of the operations of 1610 may be performed by a control message receiving manager 730 as described with reference to FIG. 7.

At 1615, the method may include identifying, in accordance with a TCI configuration, at least one TCI state for the downlink message from the first set of TCI states, the second set of TCI states, or both. The operations of 1615 may be performed in accordance with examples as disclosed herein. In some examples, aspects of the operations of 1615 may be performed by a TCI state manager 735 as described with reference to FIG. 7.

At 1620, the method may include monitoring for the downlink message using the at least one TCI state corresponding to one of the first CORESET or the second CORESET. The operations of 1620 may be performed in accordance with examples as disclosed herein. In some examples, aspects of the operations of 1620 may be performed by a downlink monitoring manager 740 as described with reference to FIG. 7.

Figure 17:
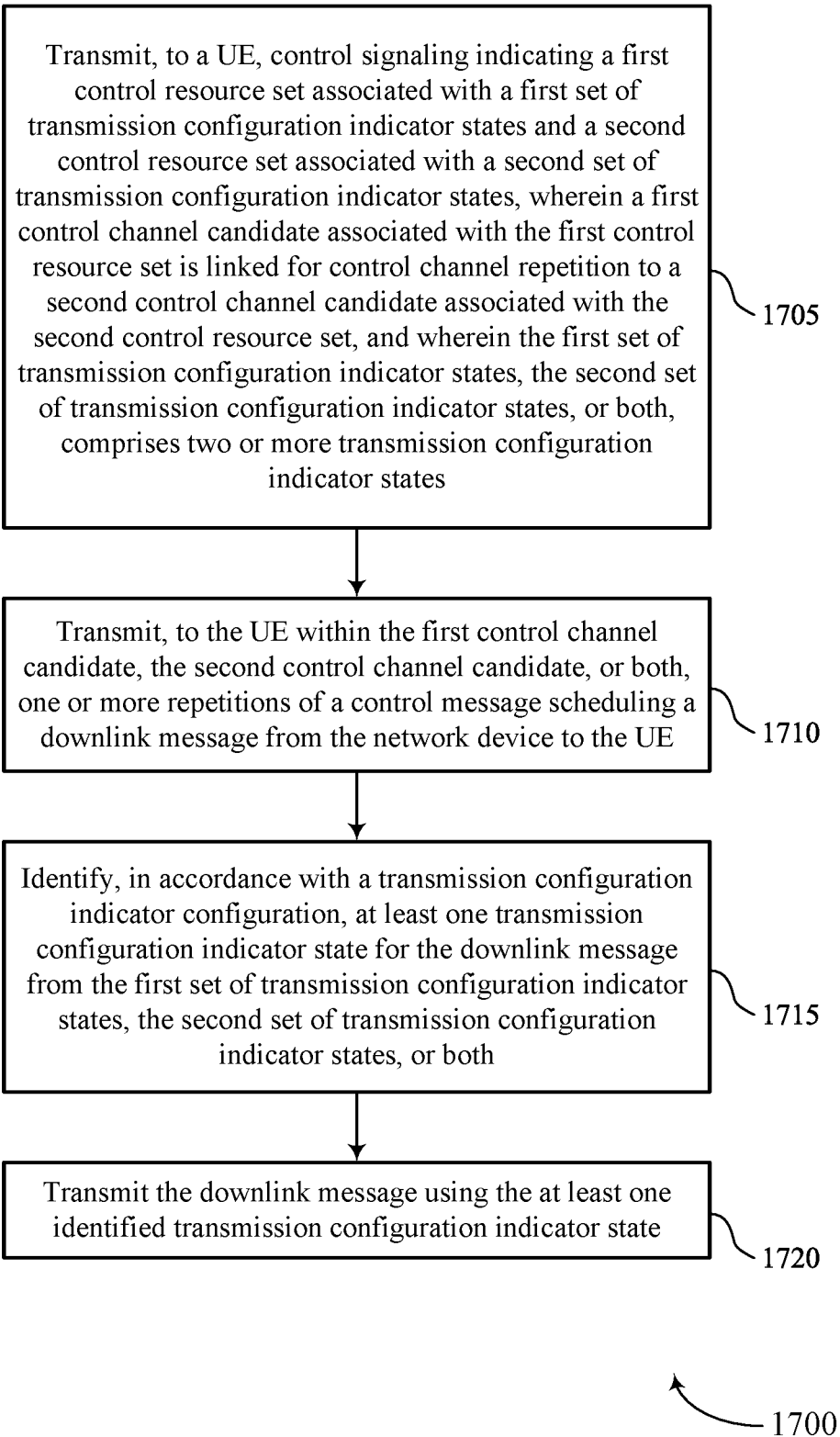

FIG. 17 shows a flowchart illustrating a method 1700 that supports techniques for TCI states of SFN control channel repetitions in accordance with aspects of the present disclosure. The operations of the method 1700 may be implemented by a base station or its components as described herein. For example, the operations of the method 1700 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1705, the method may include transmitting, to a UE, control signaling indicating a first CORESET associated with a first set of TCI states and a second CORESET associated with a second set of TCI states, where a first control channel candidate associated with the first CORESET is linked for control channel repetition to a second control channel candidate associated with the second CORESET, and where the first set of TCI states, the second set of TCI states, or both, includes two or more TCI states. The operations of 1705 may be performed in accordance with examples as disclosed herein. In some examples, aspects of the operations of 1705 may be performed by a control signaling transmitting manager 1125 as described with reference to FIG. 11.

At 1710, the method may include transmitting, to the UE within the first control channel candidate, the second control channel candidate, or both, one or more repetitions of a control message scheduling a downlink message from the base station to the UE. The operations of 1710 may be performed in accordance with examples as disclosed herein. In some examples, aspects of the operations of 1710 may be performed by a control message transmitting manager 1130 as described with reference to FIG. 11.

At 1715, the method may include identifying, in accordance with a TCI configuration, at least one TCI state for the downlink message from the first set of TCI states, the second set of TCI states, or both. The operations of 1715 may be performed in accordance with examples as disclosed herein. In some examples, aspects of the operations of 1715 may be performed by a TCI state manager 1135 as described with reference to FIG. 11.

At 1720, the method may include transmitting the downlink message using the at least one identified TCI state. The operations of 1720 may be performed in accordance with examples as disclosed herein. In some examples, aspects of the operations of 1720 may be performed by a downlink message transmitting manager 1140 as described with reference to FIG. 11.

The following provides an overview of aspects of the present disclosure:

Aspect 1: A method for wireless communication at a UE, comprising: receiving, from a network device, control signaling indicating a first CORESET associated with a first set of TCI states and a second CORESET associated with a second set of TCI states, wherein a first control channel candidate associated with the first CORESET is linked for control channel repetition to a second control channel candidate associated with the second CORESET, and wherein the first set of TCI states, the second set of TCI states, or both, comprises two or more TCI states; receiving, from the network device within the first control channel candidate, the second control channel candidate, or both, one or more repetitions of a control message scheduling a downlink message from the network device to the UE; identifying, in accordance with a TCI configuration, at least one TCI state for the downlink message from the first set of TCI states, the second set of TCI states, or both; and monitoring for the downlink message using the at least one identified TCI state.

Aspect 2: The method of aspect 1, further comprising: receiving the downlink message in accordance with the identified TCI state and based at least in part on the monitoring.

Aspect 3: The method of any of aspects 1 through 2, further comprising: receiving, via the control signaling, an indication of the TCI configuration, wherein the identifying is based at least in part on the additional control signaling.

Aspect 4: The method of any of aspects 1 through 3, wherein monitoring for the downlink message comprises: monitoring for the downlink message using the at least one TCI state that is associated with a highest TCI state identifier or a lowest TCI state identifier among the first set of TCI states and the second set of TCI states.

Aspect 5: The method of any of aspects 1 through 4, wherein monitoring for the downlink message comprises: monitoring for the downlink message using the at least one TCI state corresponding to one of the first CORESET or the second CORESET.

Aspect 6: The method of aspect 5, wherein monitoring for the downlink message comprises: monitoring for the downlink message using the at least one TCI state of the first CORESET or the second CORESET that is associated with a highest CORESET identifier or a lowest CORESET identifier.

Aspect 7: The method of any of aspects 5 through 6, wherein the first CORESET is associated with a first search space set and the second CORESET is associated with a second search space set, wherein monitoring for the downlink message comprises: monitoring for the downlink message using the at least one TCI state of the first CORESET or the second CORESET that is associated with a highest search space set identifier or a lowest search space set identifier.

Aspect 8: The method of any of aspects 5 through 7, wherein a set of TCI states from the first set of TCI states or the second set of TCI states comprises a single TCI state, wherein monitoring for the downlink message comprises: monitoring for the downlink message using the at least one TCI state which is associated with a CORESET of the first CORESET or the second CORESET which is associated with the single TCI state, wherein the at least one TCI state comprises the single TCI state.

Aspect 9: The method of aspect 8, wherein monitoring for the downlink message comprises: monitoring for the downlink message using a second TCI state from one of the first set of TCI states or the second set of TCI states which comprises the two or more TCI states.

Aspect 10: The method of any of aspects 5 through 9, wherein monitoring for the downlink message comprises: monitoring for the downlink message using the at least one TCI state which is associated with a CORESET of the first CORESET or the second CORESET which is associated with the two or more TCI states.

Aspect 11: The method of aspect 10, wherein the at least one TCI state comprises the two or more TCI states.

Aspect 12: The method of any of aspects 10 through 11, wherein monitoring for the downlink message comprises: monitoring for the downlink message using the at least one TCI state that is associated with a highest TCI state identifier or a lowest TCI state identifier among the two or more TCI states.

Aspect 13: The method of any of aspects 10 through 12, further comprising: receiving, from the network device, additional control signaling comprising an indication of a TCI state of the two or more TCI states, wherein identifying the at least one TCI state is based at least in part on the additional control signaling.

Aspect 14: The method of any of aspects 10 through 13, wherein monitoring for the control message comprises: monitoring for the control message using the at least one TCI state which comprises an anchor TCI state or a non-anchor TCI state.

Aspect 15: The method of any of aspects 1 through 14, wherein monitoring for the downlink message comprises: monitoring for the downlink message using the at least one TCI state based at least in part on the at least one TCI state being included within the first set of TCI states and the second set of TCI states.

Aspect 16: The method of any of aspects 1 through 15, further comprising: identifying a set of mappings between a set of TCI codepoints and a set of TCI states configured at the UE, wherein identifying the at least one TCI state is based at least in part on the set of mappings.

Aspect 17: The method of aspect 16, wherein at least one mapping of the set of mappings comprises a mapping between a TCI codepoint of the set of TCI codepoints and two TCI states of the set of TCI states, identifying the at least one TCI state is based at least in part on the at least one mapping.

Aspect 18: The method of any of aspects 1 through 17, wherein the first CORESET, the second CORESET, or both, are associated with a SFN.

Aspect 19: The method of any of aspects 1 through 18, further comprising: identifying that the one or more repetitions of the control message do not include a TCI field, wherein identifying the at least one TCI state is based at least in part on identifying that the one or more repetitions of the control message do not include the TCI field.

Aspect 20: The method of any of aspects 1 through 19, wherein the first set of TCI states, the second set of TCI states, or both, is associated with a QCL TypeD, wherein monitoring for the downlink message comprises: monitoring for the downlink message using the at least one identified TCI state based at least in part on a time interval between reception of the one or more repetitions of the control message and reception of the downlink message being greater than or equal to a threshold time interval, and based at least in part on the first set of TCI states, the second set of TCI states, or both, being associated with the QCL TypeD.

Aspect 21: A method for wireless communication at a network device, comprising: transmitting, to a UE, control signaling indicating a first CORESET associated with a first set of TCI states and a second CORESET associated with a second set of TCI states, wherein a first control channel candidate associated with the first CORESET is linked for control channel repetition to a second control channel candidate associated with the second CORESET, and wherein the first set of TCI states, the second set of TCI states, or both, comprises two or more TCI states; transmitting, to the UE within the first control channel candidate, the second control channel candidate, or both, one or more repetitions of a control message scheduling a downlink message from the network device to the UE; identifying, in accordance with a TCI configuration, at least one TCI state for the downlink message from the first set of TCI states, the second set of TCI states, or both; and transmitting the downlink message using the at least one identified TCI state.

Aspect 22: The method of aspect 21, further comprising: transmitting, via the control signaling, an indication of the TCI configuration, wherein the identifying is based at least in part on the control signaling.

Aspect 23: The method of any of aspects 21 through 22, wherein transmitting the downlink message comprises: transmitting the downlink message using the at least one TCI state that is associated with a highest TCI state identifier or a lowest TCI state identifier among the first set of TCI states and the second set of TCI states.

Aspect 24: The method of any of aspects 21 through 23, wherein transmitting the downlink message comprises: transmitting the downlink message using the at least one TCI state corresponding to one of the first CORESET or the second CORESET.

Aspect 25: The method of aspect 24, wherein transmitting the downlink message comprises: transmitting the downlink message using the at least one TCI state of the first CORESET or the second CORESET that is associated with a highest CORESET identifier or a lowest CORESET identifier.

Aspect 26: The method of any of aspects 24 through 25, wherein the first CORESET is associated with a first search space set and the second CORESET is associated with a second search space set, wherein transmitting the downlink message comprises: transmitting the downlink message using the at least one TCI state of the first CORESET or the second CORESET that is associated with a highest search space set identifier or a lowest search space set identifier.

Aspect 27: The method of any of aspects 24 through 26, wherein a set of TCI states from the first set of TCI states or the second set of TCI states comprises a single TCI state, wherein transmitting the downlink message comprises: transmitting the downlink message using the at least one TCI state which is associated with a CORESET of the first CORESET or the second CORESET which is associated with the single TCI state, wherein the at least one TCI state comprises the single TCI state.

Aspect 28: The method of aspect 27, wherein transmitting the downlink message comprises: transmitting the downlink message using a second TCI state from one of the first set of TCI states or the second set of TCI states which comprises the two or more TCI states.

Aspect 29: The method of any of aspects 24 through 28, wherein transmitting the downlink message comprises: transmitting the downlink message using the at least one TCI state which is associated with a CORESET of the first CORESET or the second CORESET which is associated with the two or more TCI states.

Aspect 30: The method of aspect 29, wherein the at least one TCI state comprises the two or more TCI states.

Aspect 31: The method of any of aspects 29 through 30, wherein transmitting the downlink message comprises: transmitting the downlink message using the at least one TCI state that is associated with a highest TCI state identifier or a lowest TCI state identifier among the two or more TCI states.

Aspect 32: The method of any of aspects 29 through 31, further comprising: transmitting, to the UE, additional control signaling comprising an indication of a TCI state of the two or more TCI states, wherein identifying the at least one TCI state is based at least in part on the additional control signaling.

Aspect 33: The method of any of aspects 29 through 32, wherein transmitting the control message comprises: transmitting the control message using the at least one TCI state which comprises an anchor TCI state or a non-anchor TCI state.

Aspect 34: The method of any of aspects 21 through 33, wherein transmitting the downlink message comprises: transmitting the downlink message using the at least one TCI state based at least in part on the at least one TCI state being included within the first set of TCI states and the second set of TCI states.

Aspect 35: The method of any of aspects 21 through 34, further comprising: identifying a set of mappings between a set of TCI codepoints and a set of TCI states configured at the UE, wherein identifying the at least one TCI state is based at least in part on the set of mappings.

Aspect 36: The method of aspect 35, wherein at least one mapping of the set of mappings comprises a mapping between a TCI codepoint of the set of TCI codepoints and two TCI states of the set of TCI states, identifying the at least one TCI state is based at least in part on the at least one mapping.

Aspect 37: The method of any of aspects 21 through 36, wherein the first CORESET, the second CORESET, or both, are associated with a SFN.

Aspect 38: The method of any of aspects 21 through 37, further comprising: identifying that the one or more repetitions of the control message do not include a TCI field, wherein identifying the at least one TCI state is based at least in part on identifying that the one or more repetitions of the control message do not include the TCI field.

Aspect 39: An apparatus for wireless communication at a UE, comprising a processor; memory coupled with the processor; and instructions stored in the memory and executable by the processor to cause the apparatus to perform a method of any of aspects 1 through 20.

Aspect 40: An apparatus for wireless communication at a UE, comprising at least one means for performing a method of any of aspects 1 through 20.

Aspect 41: A non-transitory computer-readable medium storing code for wireless communication at a UE, the code comprising instructions executable by a processor to perform a method of any of aspects 1 through 20.

Aspect 42: An apparatus for wireless communication at a network device, comprising a processor; memory coupled with the processor; and instructions stored in the memory and executable by the processor to cause the apparatus to perform a method of any of aspects 21 through 38.

Aspect 43: An apparatus for wireless communication at a network device, comprising at least one means for performing a method of any of aspects 21 through 38.

Aspect 44: A non-transitory computer-readable medium storing code for wireless communication at a network device, the code comprising instructions executable by a processor to perform a method of any of aspects 21 through 38.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    receiving, from a network device, control signaling indicating a first control resource set associated with a first set of transmission configuration indicator states and a second control resource set associated with a second set of transmission configuration indicator states, the control signaling indicating to select, for monitoring of a downlink message, a transmission configuration indicator state, of two or more transmission configuration indicator states, that is associated with a highest search space set identifier, wherein a first control channel candidate associated with the first control resource set is linked for control channel repetition to a second control channel candidate associated with the second control resource set, and wherein the first set of transmission configuration indicator states, the second set of transmission configuration indicator states, or both, comprises two or more transmission configuration indicator states;
    receiving, from the network device within both the first control channel candidate and the second control channel candidate, one or more repetitions of a same control message scheduling the downlink message from the network device to the UE based at least in part on the first control channel candidate being linked to the second control channel candidate; and
    monitoring for the downlink message using the transmission configuration indicator state that is associated with the highest search space set identifier in accordance with the control signaling.

2. The method of claim 1, further comprising:
    receiving the downlink message in accordance with the transmission configuration indicator state and based at least in part on the monitoring.

3. The method of claim 1, wherein monitoring for the downlink message comprises:
    monitoring for the downlink message using the transmission configuration indicator state corresponding to one of the first control resource set or the second control resource set.

4. The method of claim 3, wherein monitoring for the downlink message comprises:
    monitoring for the downlink message using the transmission configuration indicator state of the first control resource set or the second control resource set that is associated with a highest control resource set identifier.

5. The method of claim 3, wherein a set of transmission configuration indicator states from the first set of transmission configuration indicator states or the second set of transmission configuration indicator states comprises a single transmission configuration indicator state, wherein monitoring for the downlink message comprises:
    monitoring for the downlink message using the transmission configuration indicator state which is associated with a control resource set of the first control resource set or the second control resource set which is associated with the single transmission configuration indicator state, wherein the transmission configuration indicator state comprises the single transmission configuration indicator state; and
    monitoring for the downlink message using a second transmission configuration indicator state from one of the first set of transmission configuration indicator states or the second set of transmission configuration indicator states which comprises the two or more transmission configuration indicator states.

6. The method of claim 3, wherein monitoring for the downlink message comprises:
    monitoring for the downlink message using the transmission configuration indicator state which is associated with a control resource set of the first control resource set or the second control resource set which is associated with the two or more transmission configuration indicator states.

7. The method of claim 6, wherein monitoring for the downlink message comprises:
    monitoring for the downlink message using the transmission configuration indicator state which comprises an anchor transmission configuration indicator state or a non-anchor transmission configuration indicator state.

8. The method of claim 1, further comprising:
    identifying a set of mappings between a set of transmission configuration indicator codepoints and a set of transmission configuration indicator states configured at the UE, wherein identifying the transmission configuration indicator state is based at least in part on the set of mappings, wherein at least one mapping of the set of mappings comprises a mapping between a transmission configuration indicator codepoint of the set of transmission configuration indicator codepoints and two transmission configuration indicator states of the set of transmission configuration indicator states.

9. The method of claim 1, further comprising:
    identifying that the one or more repetitions of the same control message do not include a transmission configuration indicator field.

10. The method of claim 1, wherein the first set of transmission configuration indicator states, the second set of transmission configuration indicator states, or both, is associated with a quasi co-location TypeD, wherein monitoring for the downlink message comprises:
    monitoring for the downlink message using the transmission configuration indicator state based at least in part on a time interval between reception of the one or more repetitions of the same control message and reception of the downlink message being greater than or equal to a threshold time interval, and based at least in part on the first set of transmission configuration indicator states, the second set of transmission configuration indicator states, or both, being associated with the quasi co-location TypeD.

11. A method for wireless communication at a network device, comprising:
    transmitting, to a user equipment (UE), control signaling indicating a first control resource set associated with a first set of transmission configuration indicator states and a second control resource set associated with a second set of transmission configuration indicator states, the control signaling indicating to select, for monitoring of a downlink message, a transmission configuration indicator state, of two or more transmission configuration indicator states, that is associated with a highest search space set identifier, wherein a first control channel candidate associated with the first control resource set is linked for control channel repetition to a second control channel candidate associated with the second control resource set, and wherein the first set of transmission configuration indicator states, the second set of transmission configuration indicator states, or both, comprises two or more transmission configuration indicator states;

transmitting, to the UE within both the first control channel candidate and the second control channel candidate, one or more repetitions of a same control message scheduling the downlink message from the network device to the UE based at least in part on the first control channel candidate being linked to the second control channel candidate; and transmitting the downlink message using the transmission configuration indicator state that is associated with a highest search space set identifier in accordance with the control signaling.

12. The method of claim 11, wherein transmitting the downlink message comprises:
transmitting the downlink message using the transmission configuration indicator state corresponding to one of the first control resource set or the second control resource set.

13. The method of claim 12, wherein transmitting the downlink message comprises:
transmitting the downlink message using the transmission configuration indicator state of the first control resource set or the second control resource set that is associated with a highest control resource set identifier.

14. The method of claim 12, wherein a set of transmission configuration indicator states from the first set of transmission configuration indicator states or the second set of transmission configuration indicator states comprises a single transmission configuration indicator state, wherein transmitting the downlink message comprises:
transmitting the downlink message using the transmission configuration indicator state which is associated with a control resource set of the first control resource set or the second control resource set which is associated with the single transmission configuration indicator state, wherein the transmission configuration indicator state comprises the single transmission configuration indicator state; and
transmitting the downlink message using a second transmission configuration indicator state from one of the first set of transmission configuration indicator states or the second set of transmission configuration indicator states which comprises the two or more transmission configuration indicator states.

15. The method of claim 12, wherein transmitting the downlink message comprises:
transmitting the downlink message using the transmission configuration indicator state which is associated with a control resource set of the first control resource set or the second control resource set which is associated with the two or more transmission configuration indicator states.

16. The method of claim 15, wherein transmitting the downlink message comprises:
transmitting the downlink message using the transmission configuration indicator state which comprises an anchor transmission configuration indicator state or a non-anchor transmission configuration indicator state.

17. The method of claim 11, further comprising:
identifying a set of mappings between a set of transmission configuration indicator codepoints and a set of transmission configuration indicator states configured at the UE, wherein identifying the transmission configuration indicator state is based at least in part on the set of mappings, wherein at least one mapping of the set of mappings comprises a mapping between a transmission configuration indicator codepoint of the set of transmission configuration indicator codepoints and two transmission configuration indicator 8 states of the set of transmission configuration indicator states.

18. The method of claim 11, further comprising:
identifying that the one or more repetitions of the same control message do not include a transmission configuration indicator field, wherein identifying the transmission configuration indicator state is based at least in part on identifying that the one or more repetitions of the same control message do not include the transmission configuration indicator field.

19. An apparatus for wireless communication at a user equipment (UE), comprising:
one or more processors;
memory coupled with the one or more processors; and
instructions stored in the memory and executable by the one or more processors to cause the apparatus to:
receive, from a network device, control signaling indicating a first control resource set associated with a first set of transmission configuration indicator states and a second control resource set associated with a second set of transmission configuration indicator states, the control signaling indicating to select, for monitoring of a downlink message, a transmission configuration indicator state, of two or more transmission configuration indicator states, that is associated with a highest search space set identifier, wherein a first control channel candidate associated with the first control resource set is linked for control channel repetition to a second control channel candidate associated with the second control resource set, and wherein the first set of transmission configuration indicator states, the second set of transmission configuration indicator states, or both, comprises two or more transmission configuration indicator states;
receive, from the network device within both the first control channel candidate and the second control channel candidate, one or more repetitions of a same control message scheduling the downlink message from the network device to the UE based at least in part on the first control channel candidate being linked to the second control channel candidate; and
monitor for the downlink message using the transmission configuration indicator state that is associated with a highest search space set identifier in accordance with the control signaling.

20. An apparatus for wireless communication at a network device, comprising:
one or more processors;
memory coupled with the one or more processors; and instructions stored in the memory and executable by the one or more processors to cause the apparatus to:

transmit, to a user equipment (UE), control signaling indicating a first control resource set associated with a first set of transmission configuration indicator states and a second control resource set associated with a second set of transmission configuration indicator states, the control signaling indicating to select, for monitoring of a downlink message, a transmission configuration indicator state, of two or more transmission configuration indicator states, that is associated with a highest search space set identifier, wherein a first control channel candidate associated with the first control resource set is linked for control channel repetition to a second control channel candidate associated with the second control resource set, and wherein the first set of transmission configuration indicator states, the second set of transmission configuration indicator states, or both, comprises two or more transmission configuration indicator states;

transmit, to the UE within both the first control channel candidate and the second control channel candidate, one or more repetitions of a same control message scheduling the downlink message from the network device to the UE based at least in part on the first control channel candidate being linked to the second control channel candidate; and transmit the downlink message using the transmission configuration indicator state that is associated with a highest search space set identifier in accordance with the control signaling.

\* \* \* \* \*